United States Patent
Nam et al.

(10) Patent No.: US 11,400,847 B2
(45) Date of Patent: Aug. 2, 2022

(54) REFRIGERATOR, REFRIGERATING OR WARMING APPARATUS, AND VACUUM ADIABATIC BODY

(71) Applicant: LG ELECTRONICS INC., Seoul (KR)

(72) Inventors: Hyeunsik Nam, Seoul (KR); Bongjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 205 days.

(21) Appl. No.: 16/483,854

(22) PCT Filed: Feb. 13, 2018

(86) PCT No.: PCT/KR2018/001862
§ 371 (c)(1),
(2) Date: Aug. 6, 2019

(87) PCT Pub. No.: WO2018/151495
PCT Pub. Date: Aug. 23, 2018

(65) Prior Publication Data
US 2020/0017011 A1    Jan. 16, 2020

(30) Foreign Application Priority Data

Feb. 17, 2017  (KR) .......................... 10-2017-0021561

(51) Int. Cl.
*F25D 17/04*    (2006.01)
*F25D 29/00*    (2006.01)
(Continued)

(52) U.S. Cl.
CPC ......... *B60N 3/104* (2013.01); *B60H 1/00592* (2013.01); *F25D 17/045* (2013.01);
(Continued)

(58) Field of Classification Search
CPC ......... B60N 3/104; B60N 3/10; F25D 17/045; F25D 17/067; F25D 29/005;
(Continued)

(56) References Cited

U.S. PATENT DOCUMENTS 4,326,383 A * 4/1982 Reed ....................... F25B 21/02
62/3.62
4,545,211 A    10/1985 Gaus
(Continued)

FOREIGN PATENT DOCUMENTS

| CN | 2094708 | 1/1992 |
|---|---|---|
| CN | 2691933 | 4/2005 |

(Continued)

OTHER PUBLICATIONS

European Search Report dated Nov. 12, 2020 issued in EP Application No. 18754307.9.
(Continued)

*Primary Examiner* — Frantz F Jules
*Assistant Examiner* — Martha Tadesse
(74) *Attorney, Agent, or Firm* — KED & Associates LLP

(57) ABSTRACT

A vacuum adiabatic body includes a first plate, a second plate, a sealing part that seals the first plate and the second plate to provide a space that has a predetermined temperature and is in a vacuum state, a support maintaining the space, a heat resistance unit reducing an amount of heat transferred between the first plate and the second plate, a port through which air in the third is discharged, and a heat exchange module coming into contact with an inner surface of a cavity provided by the first plate member and the second plate member so as to perform heat exchange.

20 Claims, 19 Drawing Sheets

(51) Int. Cl.
  *B60H 1/00* (2006.01)
  *B60N 3/10* (2006.01)
  *F25D 17/06* (2006.01)
(52) U.S. Cl.
  CPC ......... *F25D 17/067* (2013.01); *F25D 29/005* (2013.01); *F25D 2201/14* (2013.01); *F25D 2317/066* (2013.01); *F25D 2317/0683* (2013.01); *F25D 2700/12* (2013.01)
(58) Field of Classification Search
  CPC ............ F25D 2700/12; F25D 2201/14; F25D 2317/066; F25D 2317/0683; F25D 2400/10; F25D 11/00
  See application file for complete search history.

(56) References Cited

U.S. PATENT DOCUMENTS

| | | | | |
|---|---|---|---|---|
| 4,637,222 | A | * | 1/1987 | Fujiwara ................ B60N 3/103 62/298 |
| 4,748,823 | A | * | 6/1988 | Asano .................... B60H 1/323 62/530 |
| 4,907,419 | A | | 3/1990 | Kruck et al. |
| 4,913,713 | A | * | 4/1990 | Bender ................... B67D 1/06 222/146.6 |
| 5,007,246 | A | * | 4/1991 | Kruck .................... F25D 19/02 62/131 |
| 6,564,570 | B2 | * | 5/2003 | Koike ................... F25D 11/022 62/258 |
| 6,973,799 | B2 | * | 12/2005 | Kuehl ................ B60H 1/32281 62/434 |
| 9,170,046 | B2 | * | 10/2015 | Jung .................... F25D 23/065 |
| 2005/0235682 | A1 | | 10/2005 | Hirai et al. |
| 2007/0289976 | A1 | * | 12/2007 | Meyer .................... F25D 17/06 220/592.09 |
| 2009/0090121 | A1 | | 4/2009 | Hecht et al. |
| 2012/0104923 | A1 | * | 5/2012 | Jung .................... F25D 23/066 312/406 |
| 2018/0224197 | A1 | | 8/2018 | Jung et al. |
| 2018/0231297 | A1 | | 8/2018 | Yoo et al. |
| 2020/0023763 | A1 | | 1/2020 | Lee et al. |
| 2020/0269658 | A1 | | 8/2020 | Ki et al. |

FOREIGN PATENT DOCUMENTS

| | | | |
|---|---|---|---|
| CN | 101156037 | | 4/2008 |
| CN | 101846431 | | 9/2010 |
| CN | 105143796 | | 12/2015 |
| DE | 296 08 284 | | 9/1996 |
| EP | 1484 563 | | 12/2004 |
| EP | 2 420 760 | | 2/2012 |
| EP | 2 975 341 | | 1/2016 |
| EP | 3 583 001 | | 12/2019 |
| JP | S56-040061 | | 4/1981 |
| JP | 56040061 B | * | 9/1981 |
| JP | S60-121138 | | 6/1985 |
| JP | 2007218509 A | * | 8/2007 |
| KR | 10-2001-0047665 | | 6/2001 |
| KR | 20-0390049 | | 7/2005 |
| KR | 10-2013-0094013 | | 8/2013 |
| RU | 3989 | | 4/1997 |
| RU | 2 496 063 | | 10/2013 |
| TW | 201035509 | | 10/2010 |
| WO | WO 2017/002345 | | 1/2017 |
| WO | WO 2017/023077 | | 2/2017 |
| WO | WO 2017/023094 | | 2/2017 |
| WO | WO 2019/027235 | | 2/2019 |

OTHER PUBLICATIONS

International Search Report and Written Opinion dated Jun. 18, 2018 issued in Application No. PCT/KR2018/001862.
Chinese Office Action dated Apr. 28, 2021 issued in CN Application No. 201880010899.1.
Russian Notice of Allowance (English translation) dated Apr. 20, 2020 issued in RU Application No. 2019129087.
Chinese Office Action dated Dec. 14, 2021 issued in CN Application No. 201880010899.1.
Russian Office Action dated Dec. 24, 2021 issued in RU Application No. 2020122694.

* cited by examiner

[Fig. 1]
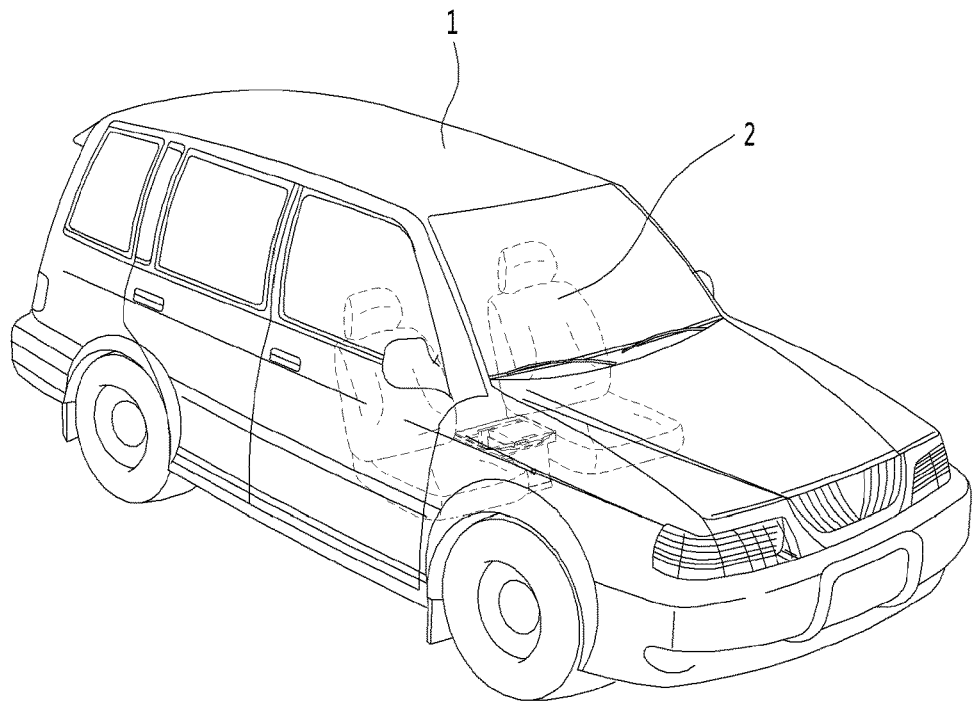
[Fig. 2]
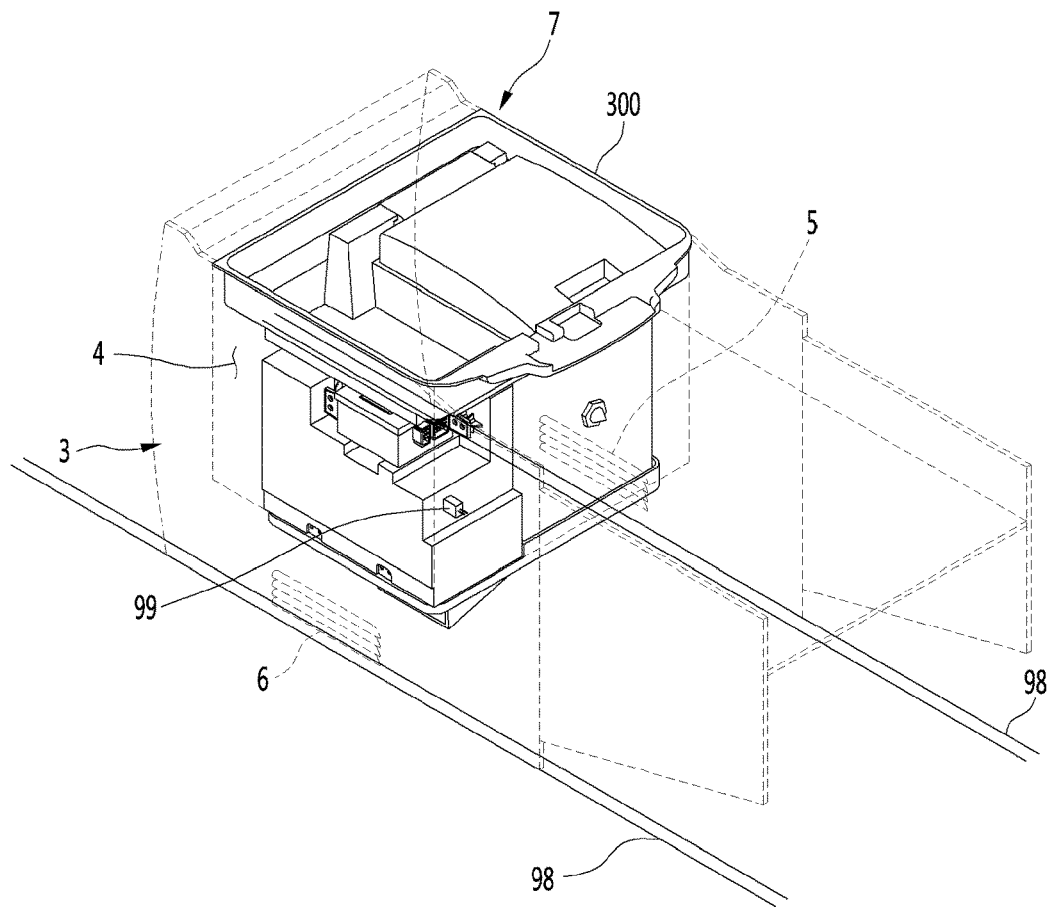

[Fig. 3]
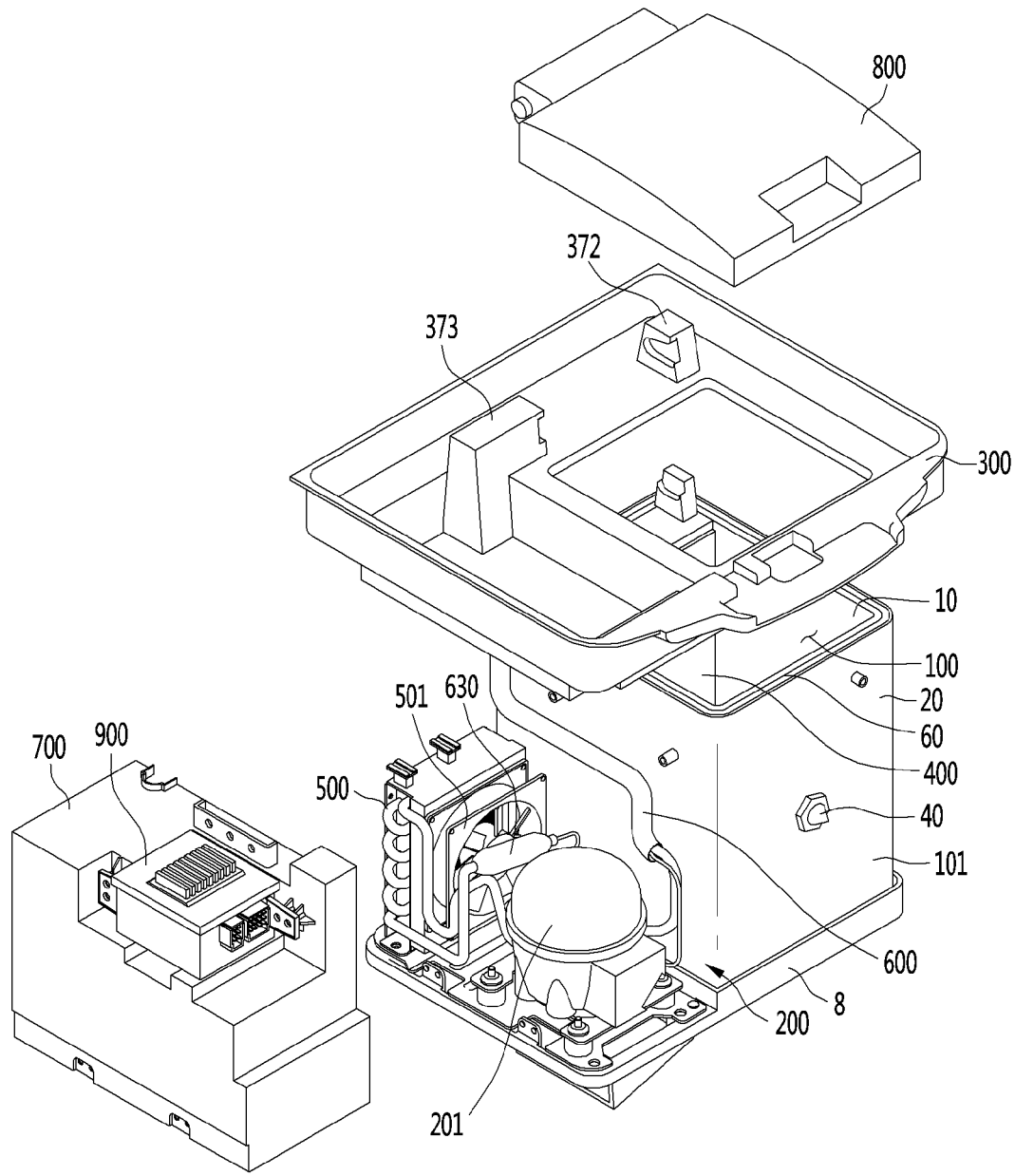

[Fig. 4]
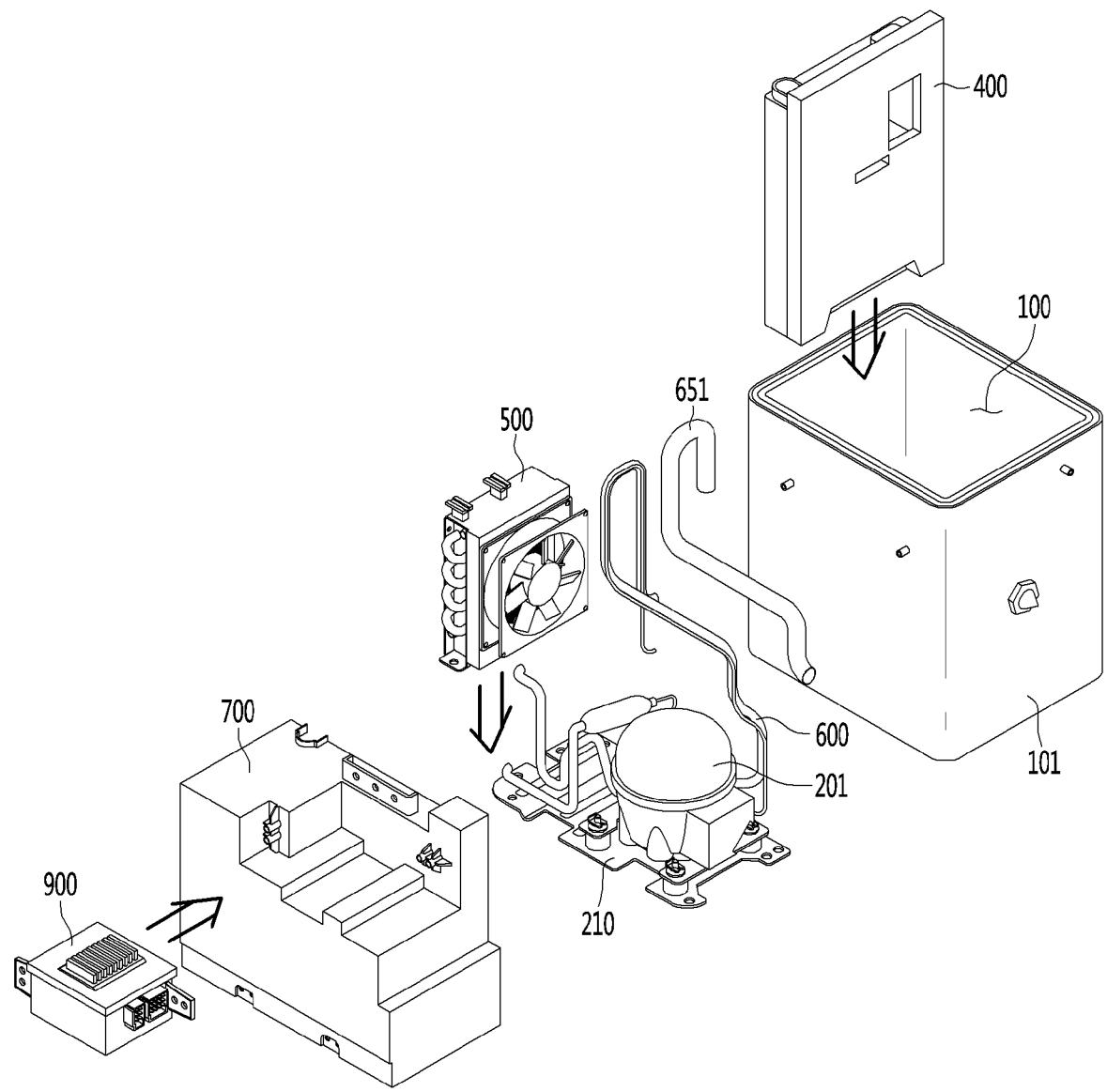

[Fig. 5]
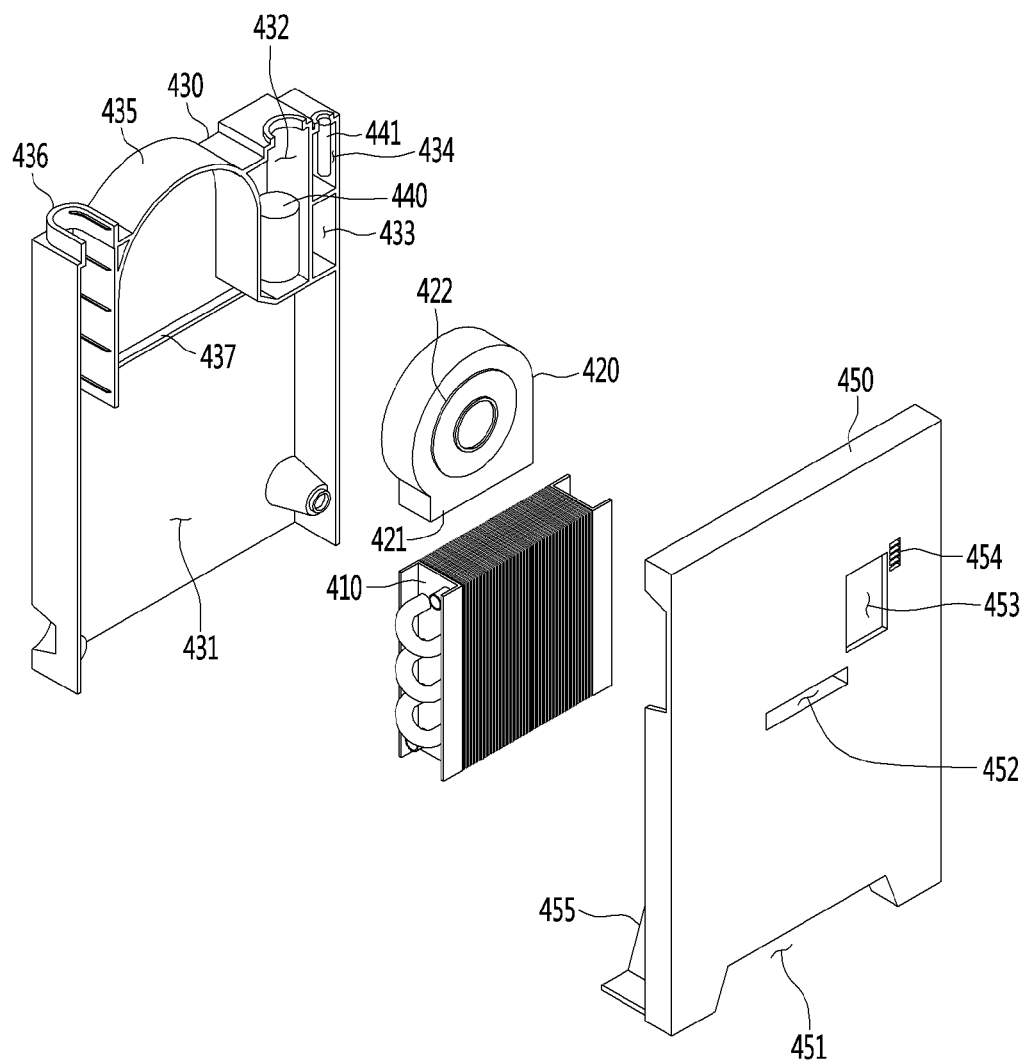

[Fig. 6]
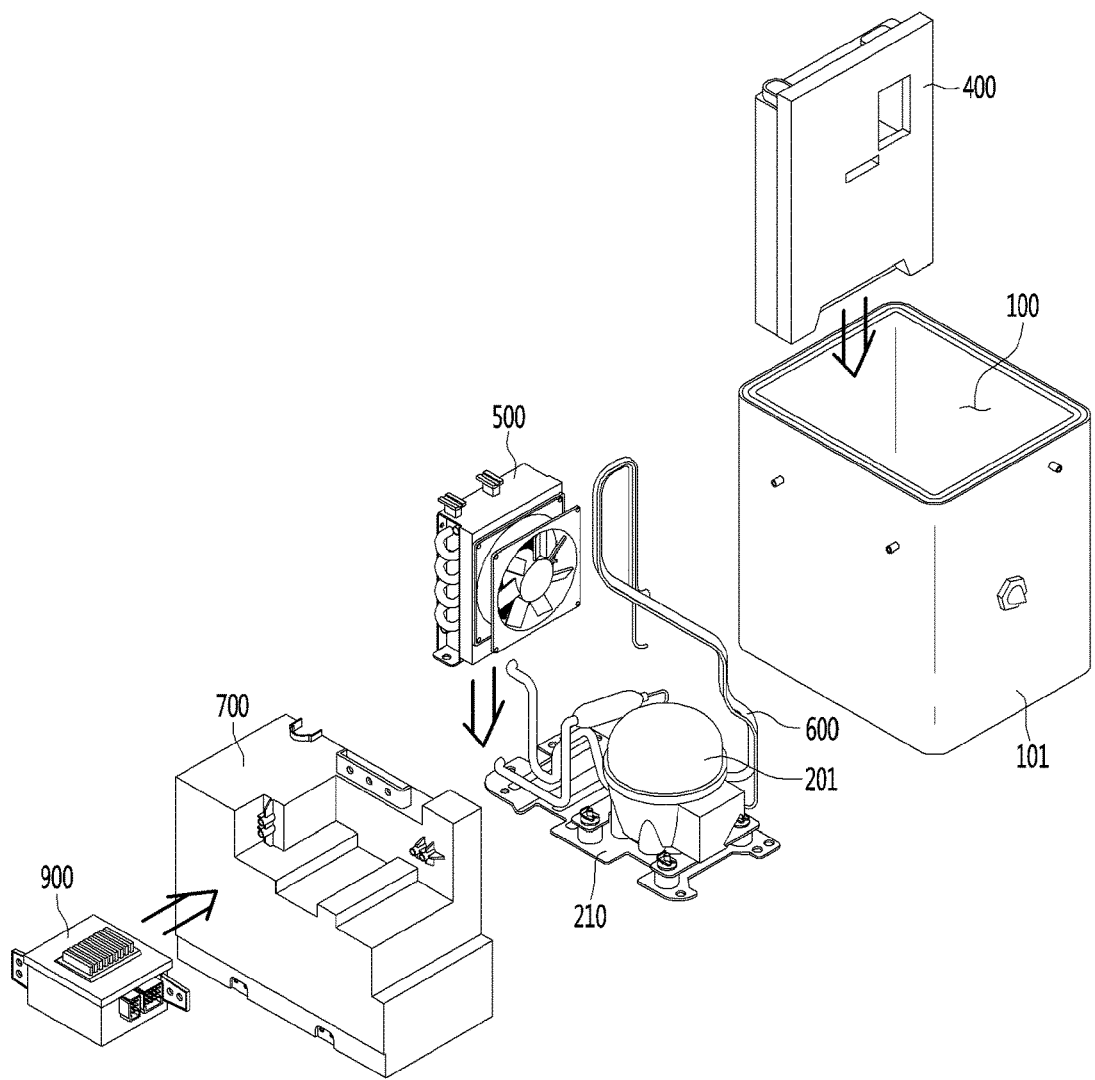
[Fig. 7]
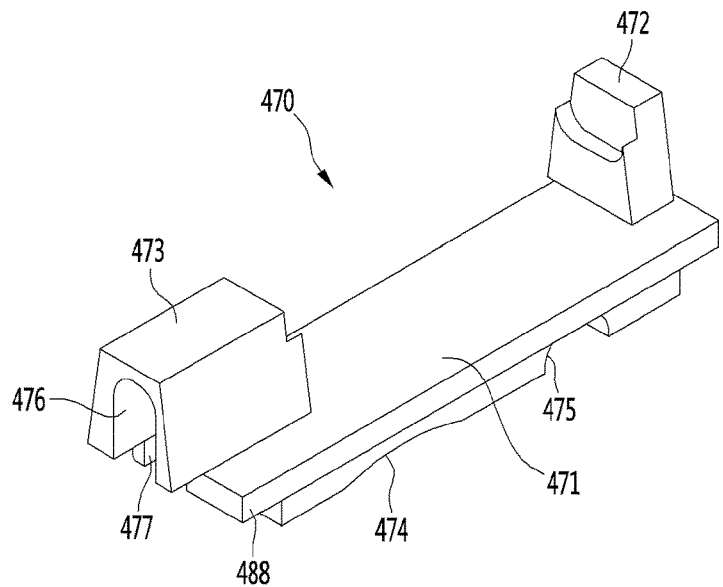

[Fig. 8]
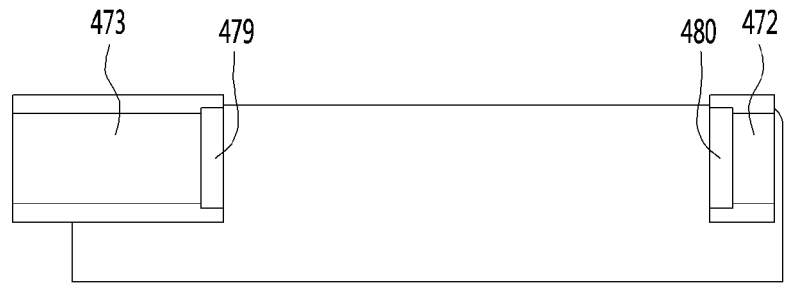
[Fig. 9]
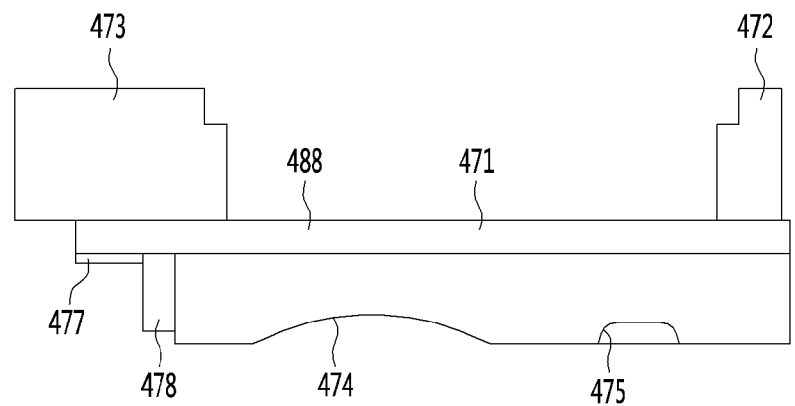
[Fig. 10]
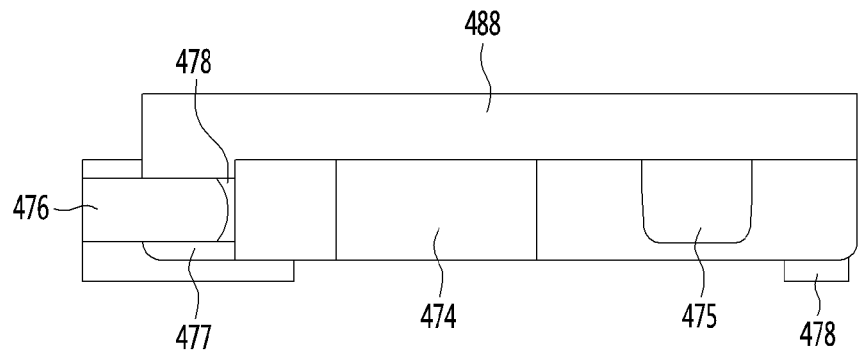

[Fig. 11]
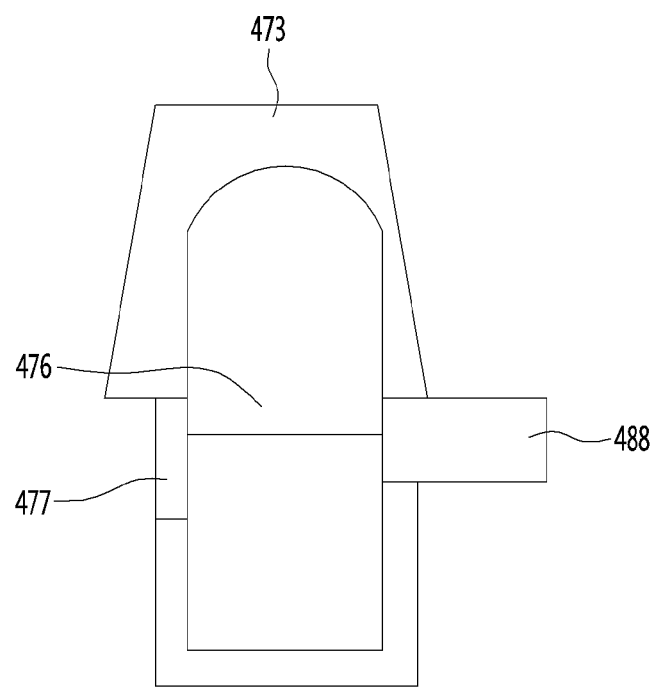

[Fig. 12]
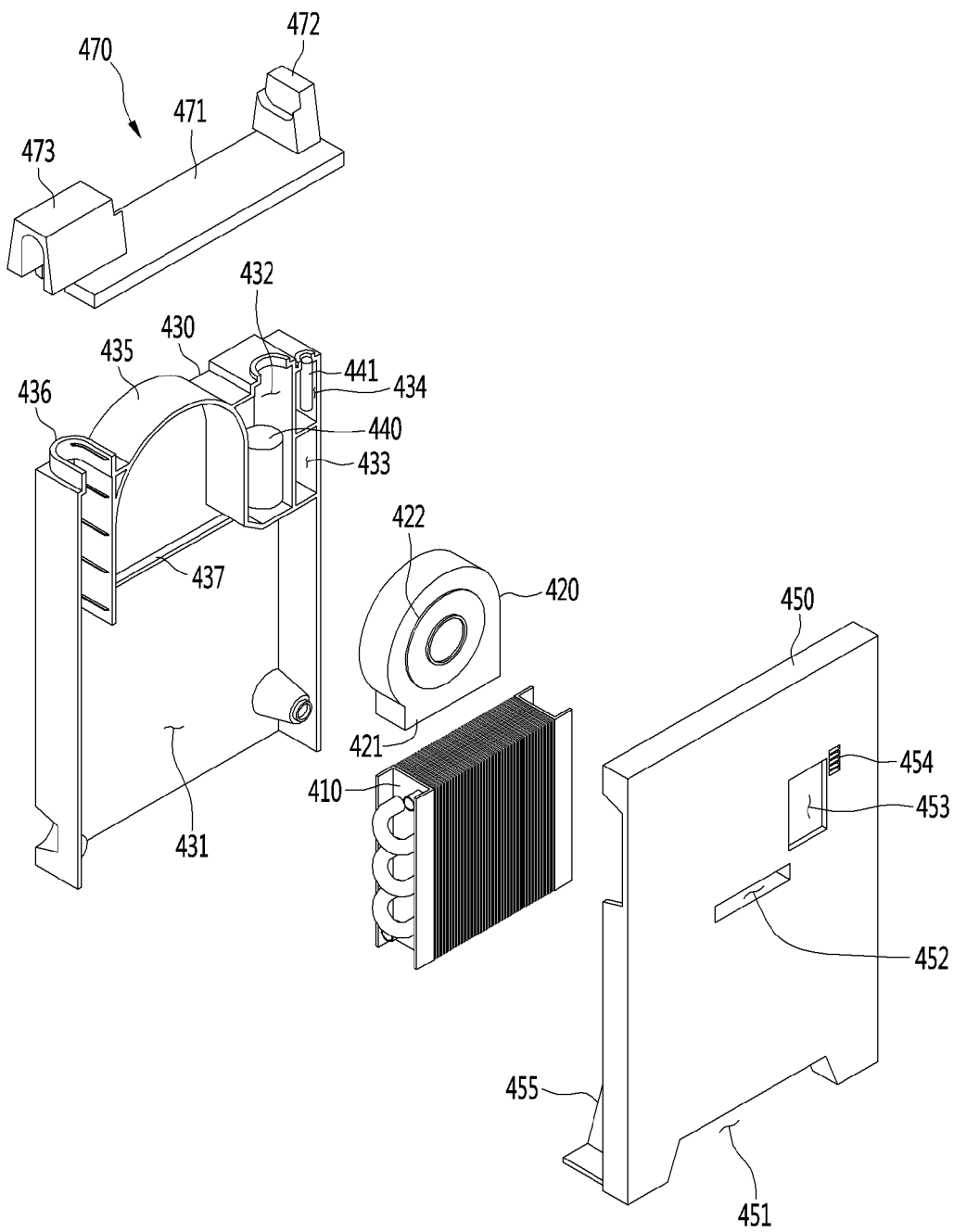

[Fig. 13]
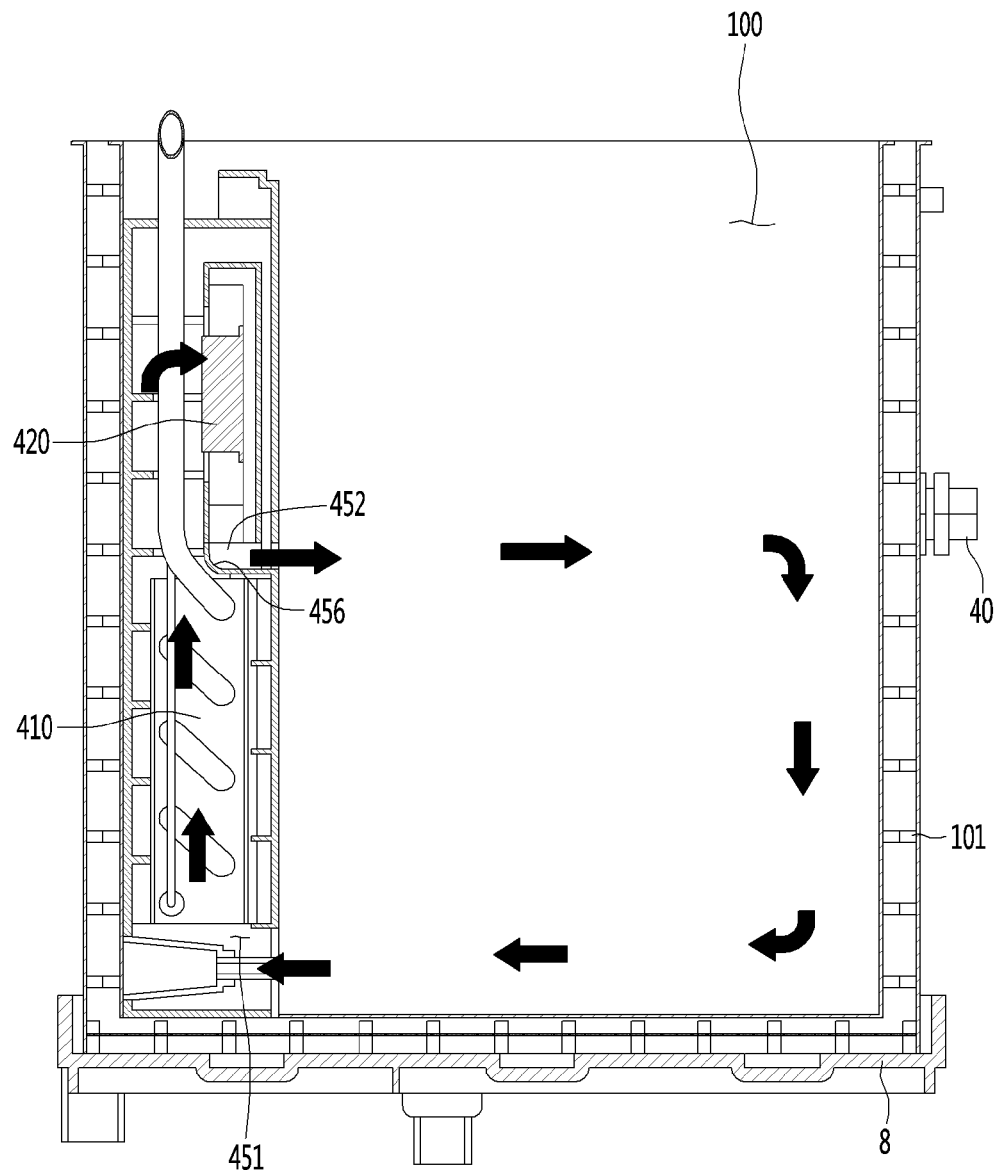

[Fig. 14]
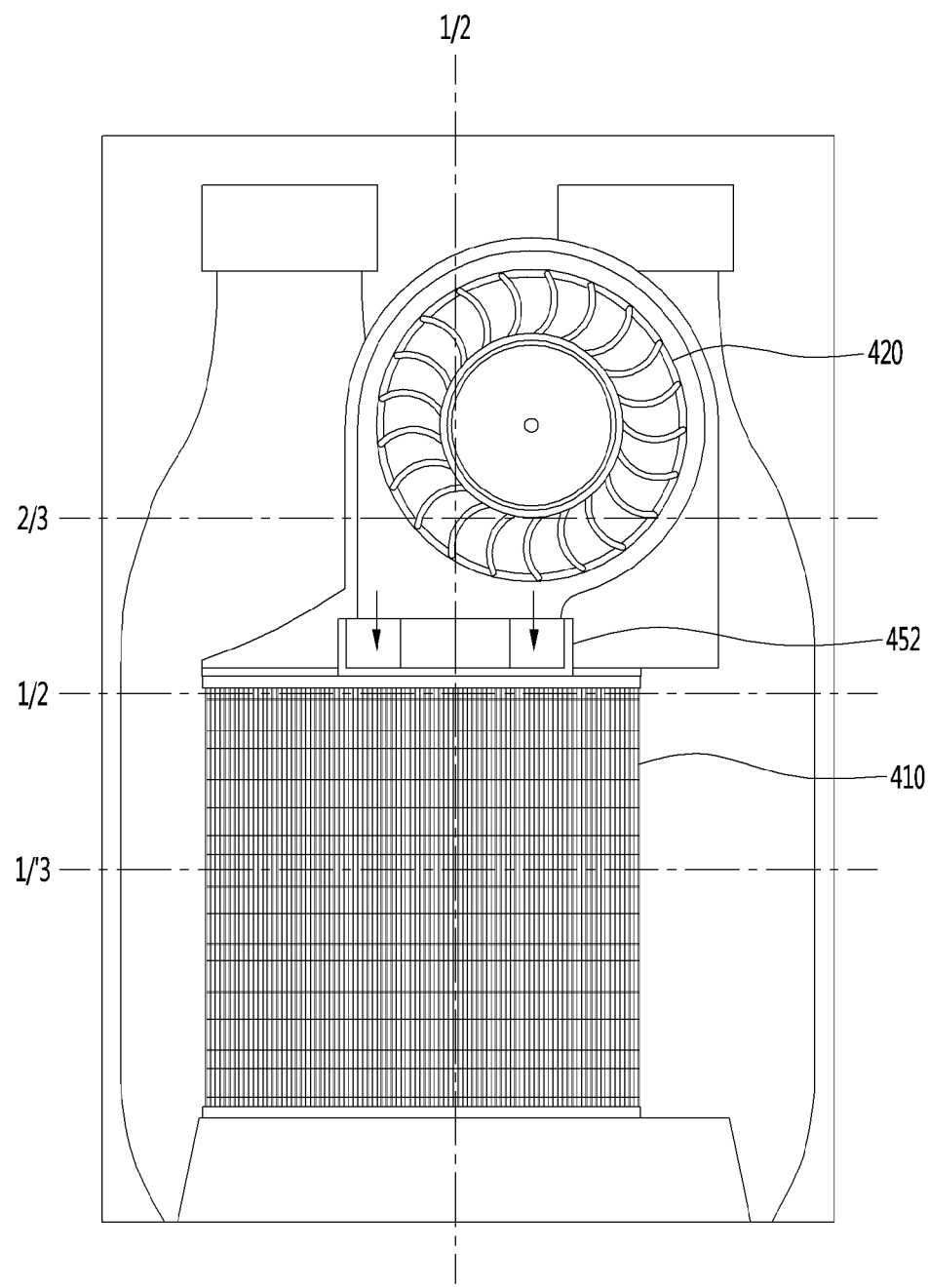

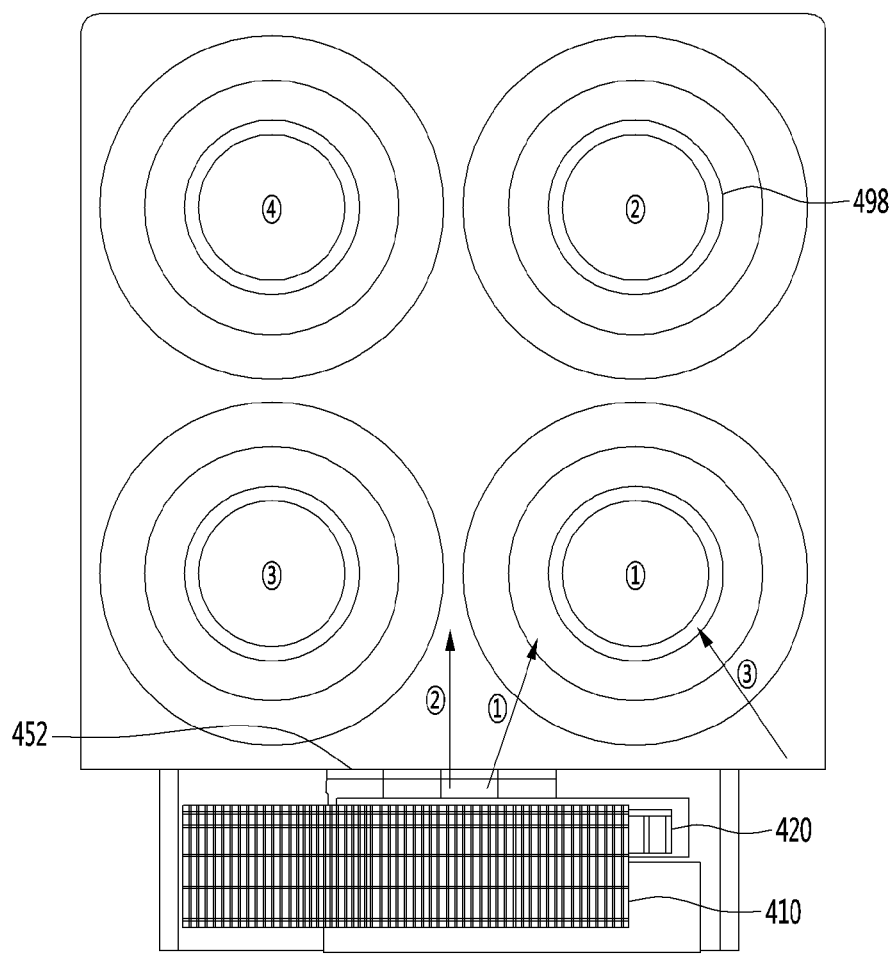
[Fig. 15]

[Fig. 16]
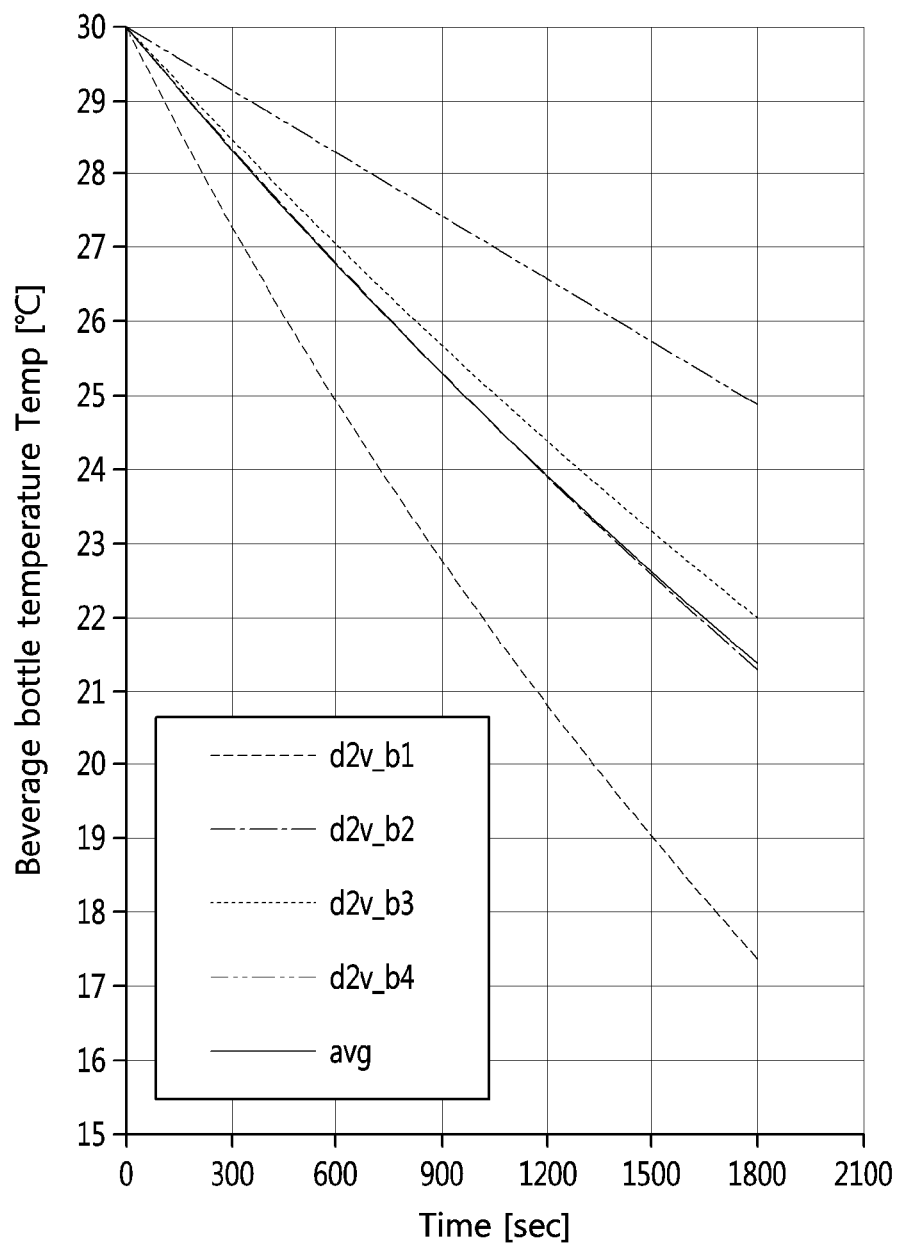

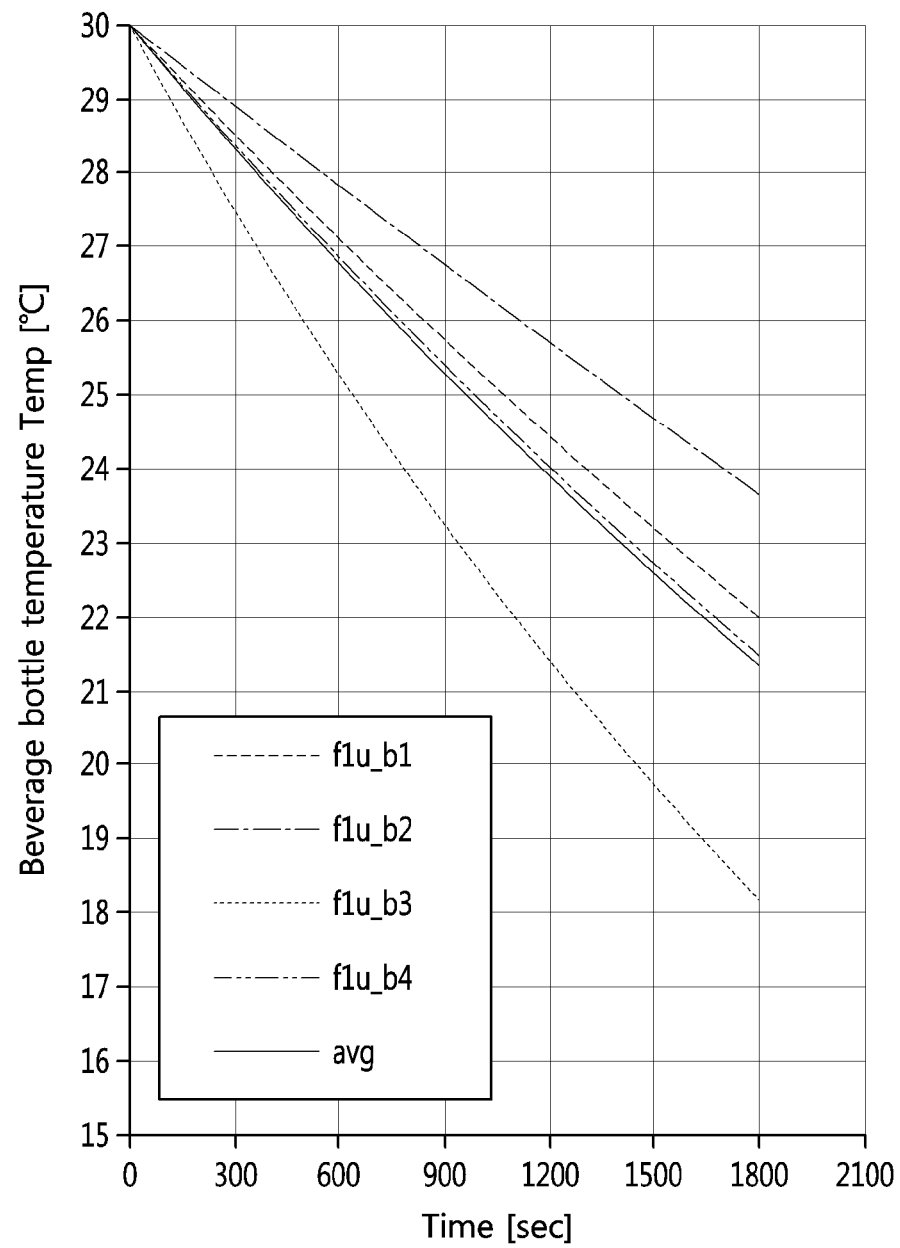
[Fig. 17]

[Fig. 18]
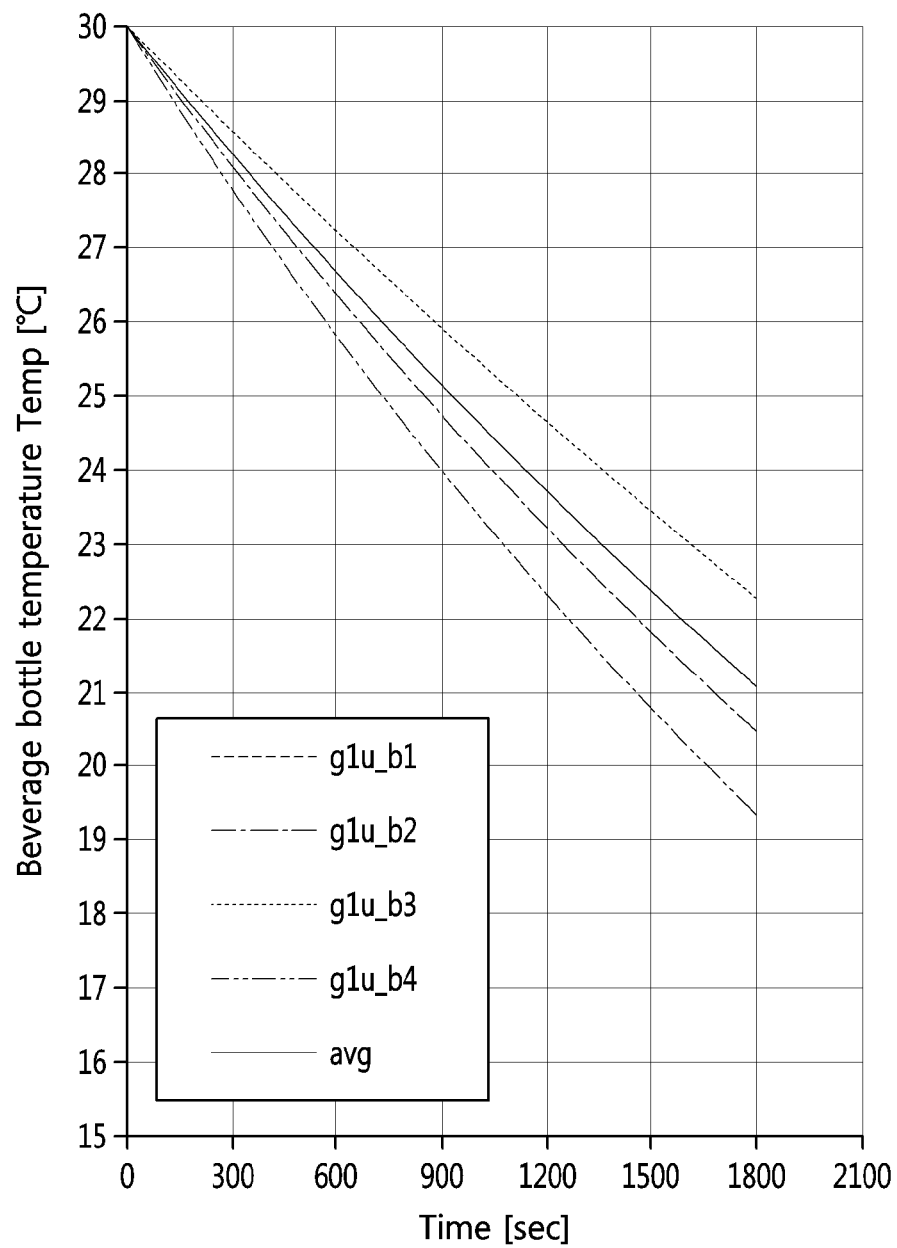

[Fig. 19]
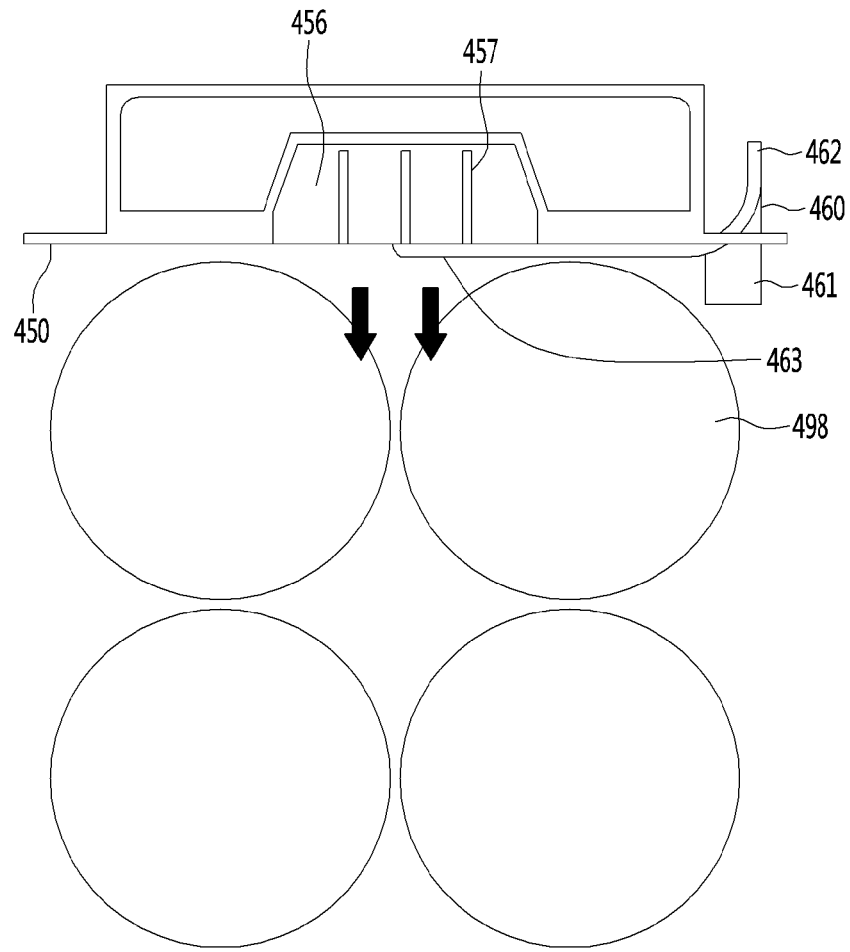
[Fig. 20]
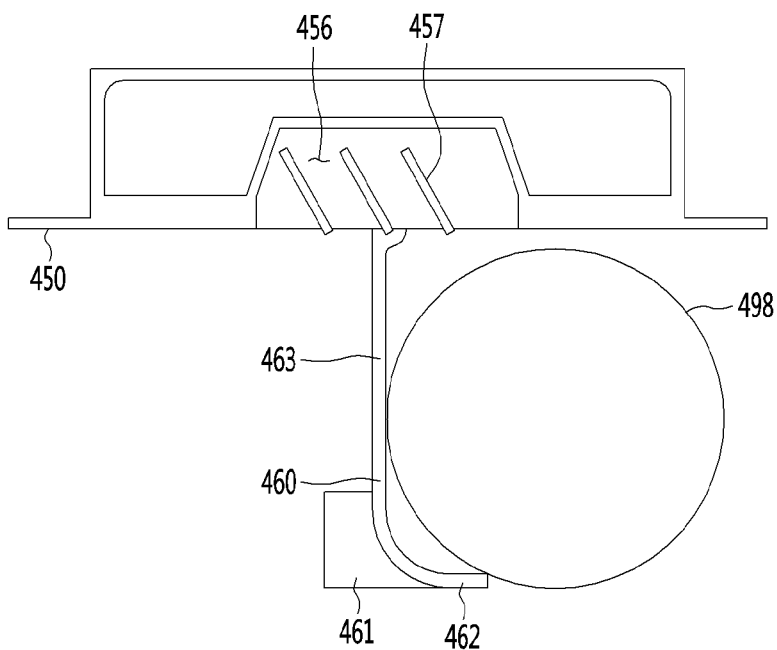

[Fig. 21]
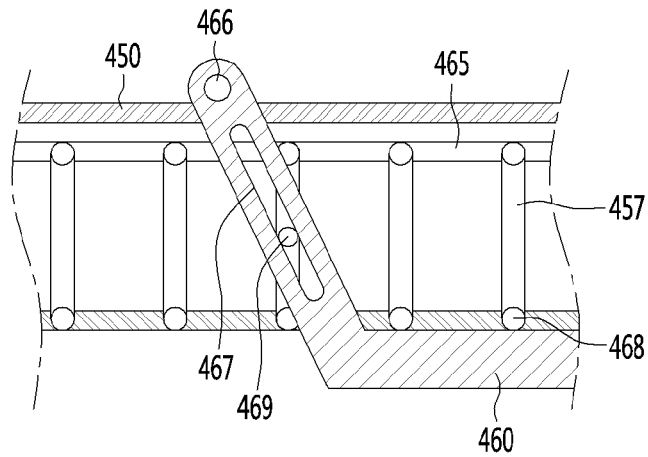
[Fig. 22]
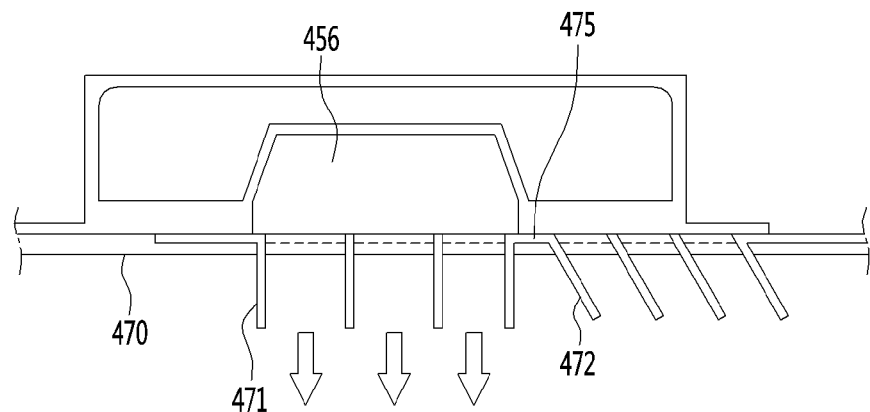
[Fig. 23]
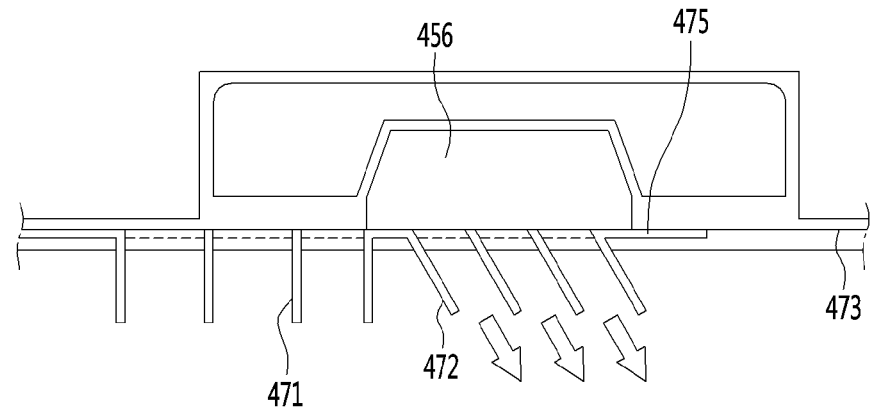

[Fig. 24]
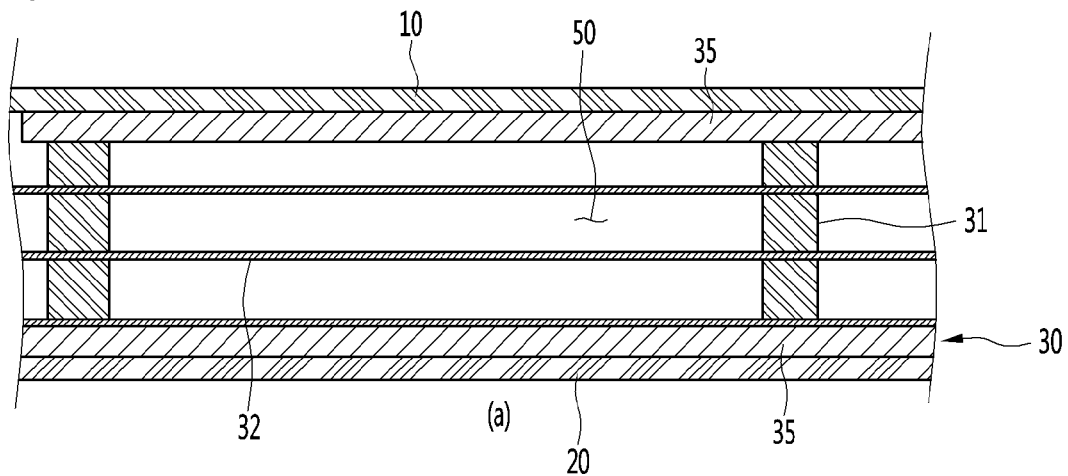
(a)
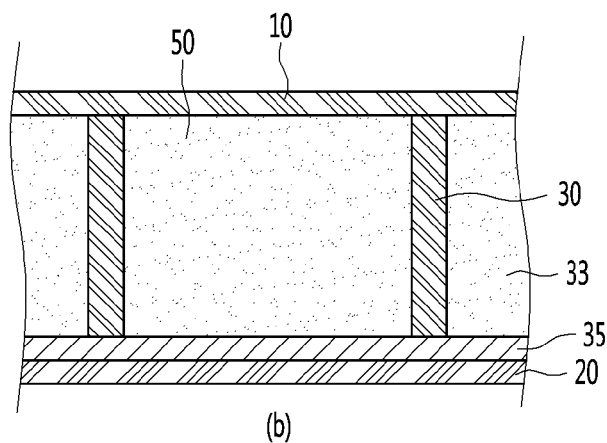
(b)
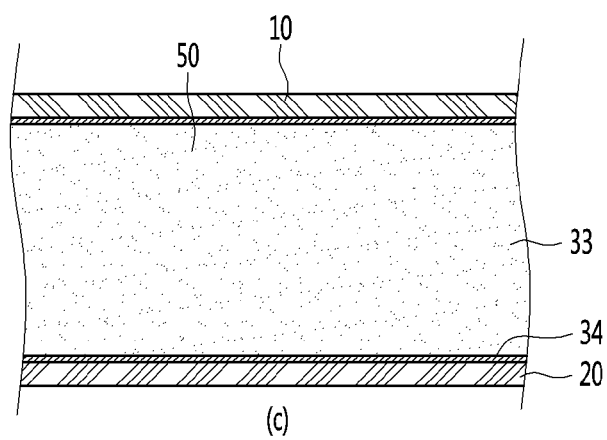
(c)

[Fig. 25]
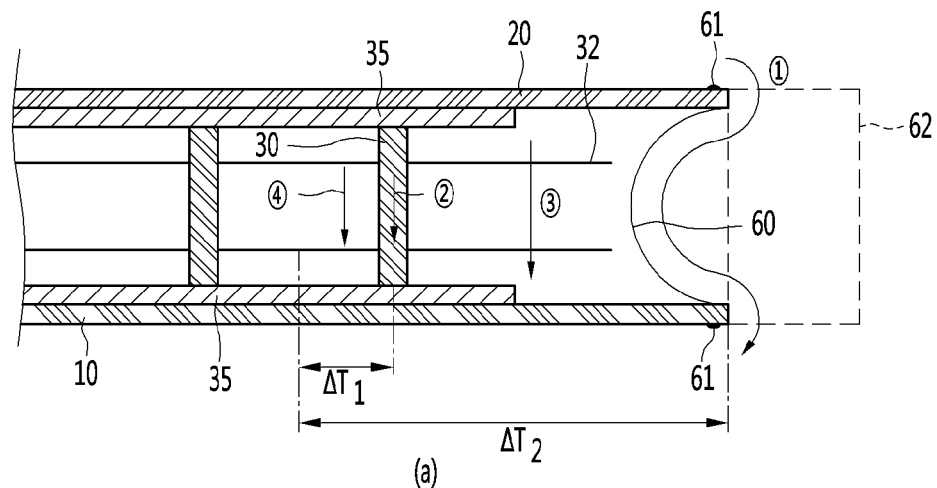
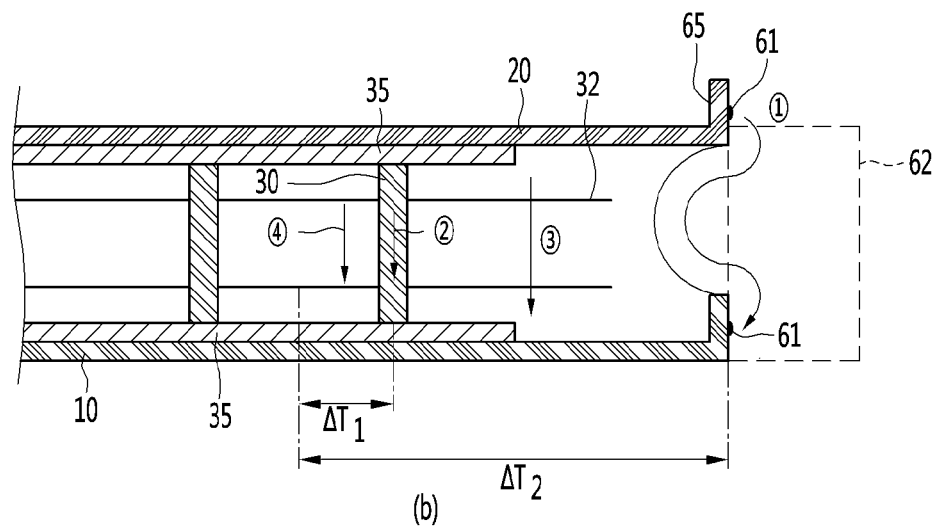

[Fig. 26]
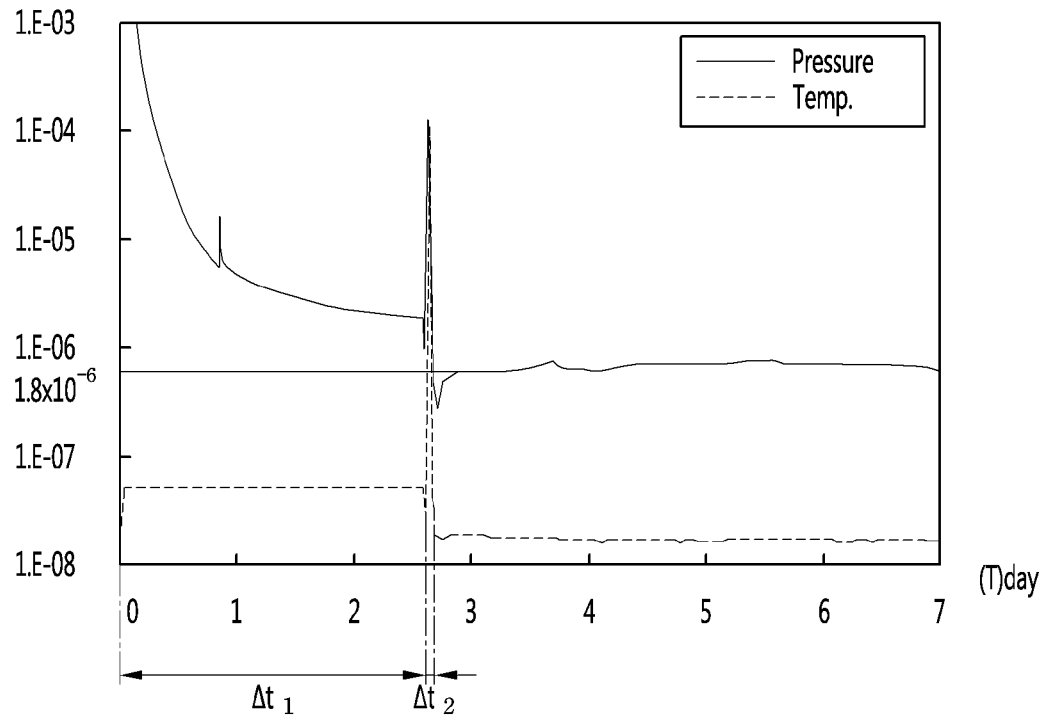
[Fig. 27]
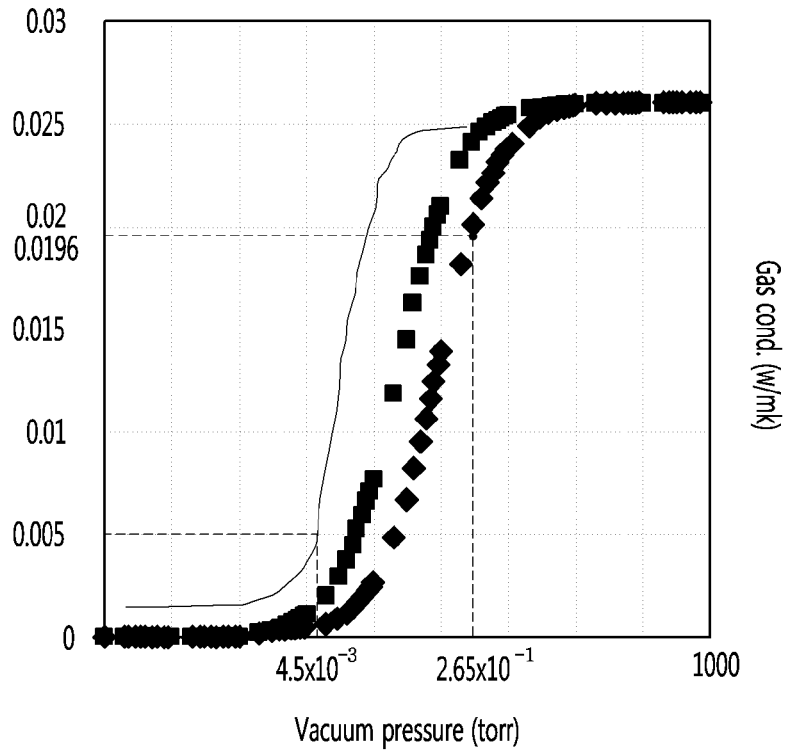

REFRIGERATOR, REFRIGERATING OR WARMING APPARATUS, AND VACUUM ADIABATIC BODY

CROSS-REFERENCE TO RELATED PATENT APPLICATIONS

This application is a U.S. National Stage Application under 35 U.S.C. § 371 of PCT Application No. PCT/KR2018/001862, filed Feb. 13, 2018, which claims priority to Korean Patent Application No. 10-2017-0021561, filed Feb. 17, 2017, whose entire disclosures are hereby incorporated by reference.

TECHNICAL FIELD

The present disclosure relates to a refrigerator, a refrigerating or warming apparatus, and a vacuum adiabatic body.

BACKGROUND ART

Refrigerators are apparatuses for storing products such as foods received in the refrigerator at a low temperature including sub-zero temperatures. As a result of this action, there is an advantage that user's intake with respect to the products may be improved, or a storage period of the products may be lengthened.

Refrigerators are classified into indoor refrigerators using a commercial power source or outdoor refrigerator using a portable power source. In addition, in recent years, a refrigerator for a vehicle, which is used after fixedly mounted on the vehicle, is increasing in supply. The refrigerator for the vehicle is more increasing in demand due to an increase in supply of vehicles and an increase in premium-class vehicle.

A conventional configuration of the refrigerator for the vehicle will be described.

First, there is an example in which heat in the refrigerator is forcibly discharged to the outside of the refrigerator by using a thermoelement. However, there is a limitation in that a cooling rate is slow due to low thermal efficiency of the thermoelement to deteriorate user's satisfaction.

For another example, there is an example in which a refrigerant or cold air is drawn from an air conditioning system installed for air-conditioning an entire interior of the vehicle and used as a cooling source for the refrigerator for the vehicle.

In this example, there is a disadvantage that a separate flow path of air or refrigerant is required to draw the air or refrigerator from the air conditioning system of the vehicle. Also, there is a limitation that low-temperature energy is lost during the movement of the air or refrigerant through the flow path. Also, there is a limitation that a position at which the refrigerator for the vehicle is installed is limited to a position that is adjacent to the air conditioning system of the vehicle due to the above-described limitations.

For another example, there is an example in which a refrigeration cycle using a refrigerant is applied.

However, in this example, since a part constituting the refrigeration cycle is large in size, most of the parts are mounted on a trunk, and only a door of a door of the refrigerator is opened to the inside of the vehicle. In this case, there is a limitation that a position for installing the refrigerator for the vehicle is limited. Also, there is a limitation that the trunk is significantly reduced in volume to reduce an amount of cargo that is capable of being loaded in the trunk.

There is U.S. Pat. No. 4,545,211 as a representative example of above-mentioned another example. The technology of the cited document has the following limitations.

First, there is a limitation that an internal volume of the vehicle refrigerator is reduced due to a large volume of the machine room. There is a limitation that the driver may not use the vehicle refrigerator without stopping the driving when the driver alone drives the vehicle because the refrigerator is installed in the back seat, and also, since the door is opened forward, there is inconvenience that it may not put an object in the front. Since the cooling in the refrigerator is performed by direct cooling, that is, by natural convection, it takes a long time to cool the product. Since the machine room is directly opened to the outside, there is a high possibility that foreign substances are mixed into the inside of the machine room to cause a failure. There is a limitation that the suctioned air is mixed again because the suction and exhaust of the air are not separated from each other to deteriorate heat efficiency. There is a limitation that inconvenience is caused to the user due to noise of the machine room according to use of the compressor.

DISCLOSURE

Technical Problem

Embodiments also provide a refrigerating or warming apparatus that is capable of increasing a capacity of a refrigerator, and a vacuum adiabatic body.

Embodiments also provide a refrigerating or warming apparatus that is capable of solving a limitation in which products accommodated in the refrigerator is slowly cooled, and a vacuum adiabatic body.

Embodiments provide a refrigerating or warming apparatus that is capable of improving energy efficiency, and a vacuum adiabatic body.

Embodiments provide a refrigerating or warming apparatus that is capable of suppressing inconvenient due to noise, and a vacuum adiabatic body.

Technical Solution

In one embodiment, to increase capacity within a refrigerator, a vacuum adiabatic body includes: a first plate member and a second plate member, which define a third space that is in a vacuum state; and a heat exchange module coming into contact with an inner surface of the cavity provided by the first plate member and the second plate member.

To solve the problem in which a product accommodated in the refrigerator is slowly cooled, the heat exchange module may include: an evaporator evaporating a refrigerant; and a first compartment in which an evaporation fan disposed on the evaporator to suction air passing through the evaporator and discharge the air to the cavity.

To accurately sense a temperature within the cavity, the heat exchange module may include: the evaporator; and a third compartment that is partitioned from the first compartment, in which the evaporation fan is accommodated, to accommodate a temperature sensor.

To brighten the inside of the cavity, the vacuum adiabatic body may further include a second compartment that is partitioned from the first compartment and the third compartment to accommodate a lamp, To improve accuracy in temperature sense of the temperature sensor, the second compartment may be interposed between the first compartment and the third compartment.

Also, the third compartment may be disposed at an apex of one side of the heat exchange module.

To apply a refrigeration cycle and allow a user to be easily accessible, the third compartment may be disposed in one direction with respect to the first compartment, and a conduit passage, through which a refrigerant conduit passes, may be disposed in the other direction.

To more improve capacity within the refrigerator, the evaporation fan may include a centrifugal fan and suctions air from a rear side to discharge the air downward.

In another embodiment, to improve energy efficiency, a refrigerating or warming apparatus includes: a refrigerator bottom frame on which the cavity and the machine room are seated in parallel; a second heat exchange module accommodated in the cavity to correspond to one surface of the cavity to allow the refrigerant to be heat-exchanged; and a temperature sensor provided in the second heat exchange module to measure a temperature of the cavity.

To improve accuracy in temperature sense within the cavity, the temperature sensor may be disposed at an apex of an upper portion of the second heat exchange module. The temperature sensor may communicate with an inner space of the cavity.

To overcome inconvenience due to noise and increase capacity within the refrigerator, the second heat exchange module may include an evaporator disposed at a lower side and a first compartment on which a sirocco fan disposed at an upper side of the evaporator is placed. To more increase the capacity within the refrigerator, the sirocco fan may suction air through a rear side thereof and discharge air to a lower side thereof.

To improve accuracy in temperature sense of the temperature sensor, the other compartment may be disposed between the first compartment and the third compartment in which the temperature sensor is disposed.

In further another embodiment, to secure sufficient capacity within a refrigerator, a refrigerating or warming apparatus includes: a refrigerator bottom frame on which the cavity and the machine room are seated; a second heat exchange module accommodated in the cavity to correspond to one surface of the cavity to allow the refrigerant to be heat-exchanged; and a cover defining an inner space of the second heat exchange module; and a fan disposed in the second heat exchange module to blow air.

To uniformly cool products within the refrigerator, the cover may include: a rear cover; and a front cover comprising a cold air suction port at a lower portion thereof to correspond to the rear cover and a cold air discharge port at an approximately central height.

To improve efficiency in cold air circulation, the cold air discharge portion may be disposed between one-two point and two-three point from the bottom of the cavity.

To uniformly cool a container to be accommodated, the cold air discharge port may be disposed at a center in a left and right direction of the cavity to discharge cold air, which introduced from a lower side, forward.

To adjust a direction of the cold air, the cover may include a louver.

To allow a user to conveniently use the refrigerator, the louver may move by being linked with a container holder supporting a container, or the louver may include a vertical louver and an inclined louver.

Advantageous Effects

According to the vacuum adiabatic body includes: the first plate member and the second plate member, which define the third space that is in the vacuum state; and the heat exchange module coming into contact with the inner surface of the cavity provided by the first plate member and the second plate member, the vacuum adiabatic body may be installed in the narrow space, and the storage space for the product may increase to allow the user to conveniently use the refrigerator.

The heat exchange module may include: an evaporator evaporating a refrigerant; and a first compartment in which an evaporation fan disposed on the evaporator to suction air passing through the evaporator and discharge the air to the cavity. Thus, the refrigerator may be more efficiency used in the narrow space.

The heat exchange module may include a third compartment that is partitioned form the first compartment, in which the evaporator and the evaporation fan are accommodated, to accommodate a temperature sensor to more accurately sense the temperature within the cavity by using the temperature sensor.

The second compartment that is partitioned from the first compartment and the third compartment to accommodate a lamp may be further provided to prevent the heat transfer from occurring between the compartments and to allow the user to easily see the inside of the refrigerator.

The second compartment may be interposed between the first compartment and the third compartment, and the third compartment may be disposed at an apex of one side of the heat exchange module. Thus, the temperature sensor may accurately sense the inner environments of the cavity regardless of external other portions and operation.

The third compartment may be disposed in one direction with respect to the first compartment, and a conduit passage, through which a refrigerant conduit passes, may be disposed in the other direction. Thus, the capacity within the refrigerator that operates by the circulation of the refrigerant may be more largely increase, and thus, the user may conveniently take out the storage container.

The evaporation fan may include a centrifugal fan and suctions air from a rear side to discharge the air downward to reduce the decrease of the mechanism, which causes the air flow, and noise.

The refrigerating or warming apparatus includes: the refrigerator bottom frame on which the cavity and the machine room are seated in parallel; the second heat exchange module accommodated in the cavity to correspond to one surface of the cavity to allow the refrigerant to be heat-exchanged; and the temperature sensor provided in the second heat exchange module to measure a temperature of the cavity. Thus, since the temperature of the cavity is accurately measured and controlled, unnecessary wastes of energy may be reduced, and the capacity within the refrigerator may increase.

The temperature sensor may be disposed at the apex of an upper portion of the second heat exchange module. The temperature sensor may communicate with an inner space of the cavity to accurately measure the inner temperature of the cavity.

The second heat exchange module may include the evaporator disposed at the lower side and the first compartment on which the sirocco fan disposed at an upper side of the evaporator is placed. Thus, the user's satisfaction due to the reduction of noise and the increase in capacity within the refrigerator may be improved.

The sirocco fan may suction air through a rear side thereof and discharge air to a lower side thereof to more increase the capacity within the refrigerator.

The other compartment may be disposed between the first compartment and the third compartment in which the temperature sensor is disposed. Thus, the sensed temperature of the cavity may be more accurate.

The refrigerating or warming apparatus includes: the refrigerator bottom frame on which the cavity and the machine room are seated; the second heat exchange module accommodated in the cavity to correspond to one surface of the cavity to allow the refrigerant to be heat-exchanged; and the cover defining an inner space of the second heat exchange module; and the fan disposed in the second heat exchange module to blow air. Thus, the capacity within the refrigerator may be secured, and the storage container within the refrigerator may be uniformly adjusted in temperature.

The cover may include: a rear cover; and a front cover comprising a cold air suction port at a lower portion thereof to correspond to the rear cover and a cold air discharge port at an approximately central height. Thus, the product within the refrigerator may be uniformly adjusted in temperature.

The cold air discharge portion may be disposed between one-two point and two-three point from the bottom of the cavity. Thus, the cold air may more uniformly circulate within the cavity.

The cold air discharge port may be disposed at a center in a left and right direction of the cavity to discharge cold air, which introduced from a lower side, forward. Thus, the cavity may be uniformly adjusted in temperature.

The cover may include the louver, and the louver may move by being linked with the container holder supporting the container. Also, the louver may include a vertical louver and an inclined louver. Thus, the action in which the container is uniformly adjusted in temperature according to the operation of the louver and the action in which the container designated by the user is quickly adjusted in temperature may be performed together.

DESCRIPTION OF DRAWINGS

FIG. 1 is a perspective view of a vehicle according to an embodiment.

FIG. 2 is an enlarged perspective view illustrating a console of the vehicle.

FIG. 3 is a schematic perspective view illustrating the inside of a vehicle refrigerator.

FIG. 4 is a view illustrating a connection relationship between a machine room and a cavity.

FIG. 5 is an exploded perspective view of an evaporation module.

FIG. 6 is a view for explaining an air flow outside a machine room of the vehicle refrigerator.

FIG. 7 is a perspective view of a hinge part adiabatic member.

FIGS. 8 to 11 are plan, front, bottom, and left views of the hinge part adiabatic member.

FIG. 12 is an exploded perspective view illustrating a relationship between the evaporation module and a hinge part adiabatic member.

FIG. 13 is a cross-sectional view of the evaporation module.

FIG. 14 is a schematic front view illustrating the inside of the cavity so as to explain a position of a cold air discharge port.

FIG. 15 is a view illustrating a discharge direction of cold air through the cold air discharge port.

FIGS. 16 to 18 are views for explaining experimental results of FIG. 15.

FIG. 19 is a view when uniform cooling is performed according to an embodiment.

FIG. 20 is a view when quick cooling is performed according to an embodiment.

FIG. 21 is a view illustrating an example of a configuration of a cold air discharge louver.

FIGS. 22 and 23 are views illustrating another example of the cold air discharge louver.

FIG. 24 is a view illustrating an internal configuration of a vacuum adiabatic body according to various embodiments.

FIG. 25 is a view of a conductive resistance sheet and a peripheral portion of the conductive resistance sheet.

FIG. 26 is a graph illustrating results obtained by observing a time and a pressure in a process of exhausting the inside of the vacuum adiabatic body when a supporting unit is used.

FIG. 27 is a graph obtained by comparing a vacuum pressure with gas conductivity.

BEST MODE

In the following description according to embodiments with reference to the drawings, the same reference numerals are given to different drawings in the case of the same constituents.

Also, in the description of each drawing, the description will be made with reference to the direction in which the vehicle is viewed from the front of the vehicle, rather than the front viewed by the driver based on the traveling direction of the vehicle. For example, the driver is on the right, and the assistant driver is on the left.

FIG. 1 is a perspective view of a vehicle according to an embodiment.

Referring to FIG. 1, a seat 2 on which a user is seated is provided in a vehicle 1. The seat 2 may be provided in a pair to be horizontally spaced apart from each other. A console is disposed between the seats 2, and a driver places items that are necessary for driving or components that are necessary for manipulating the vehicle in the console. Front seats on which the driver and the assistant driver are seated may be described as an example of the seats 2.

It should be understood that the vehicle includes various components, which are necessary for driving the vehicle, such as a moving device such as a wheel, a driving device such as an engine, and a steering device such as a steering wheel.

The refrigerator for the vehicle according to an embodiment may be preferably placed in the console. However, an embodiment of the present disclosure is not limited thereto. For example, the vehicle refrigerator may be installed in various spaces. For example, the vehicle refrigerator may be installed in a space between rear seats, a door, a glove box, and a center fascia. This is one of factors that the vehicle refrigerator according to an embodiment is capable of being installed only when power is supplied, and a minimum space is secured. However, it is a great advantage of the embodiment in that it may be installed in the console between the seats, which is limited in space due to limitations in vehicle design.

FIG. 2 is an enlarged perspective view illustrating the console of the vehicle.

Referring to FIG. 2, a console 3 may be provided as a separate part that is made of a material such as a resin. A steel frame 98 may be further provided below the console 3 to maintain strength of the vehicle, and a sensor part 99 such as a sensor may be disposed in a spacing part between the console 3 and the steel frame 98. The sensor part (or sensor)

99 may be a part that is necessary for accurately sensing an external signal and measuring a signal at a position of the driver. For example, an airbag sensor that is directly connected to the life of the driver may be mounted.

The console 3 may have a console space 4 therein, and the console space 4 may be covered by a console cover 300. The console cover 300 may be installed to the console 3 in a fixed type. Thus, it is difficult that external foreign substances are introduced into the console through the console cover 300. A vehicle refrigerator 7 is seated in the console space 4.

A suction port 5 may be provided in a right surface of the console 3 to introduce air within the vehicle into the console space 4. The suction port 5 may face the driver. An exhaust port 6 may be provided in a left surface of the console 3 to exhaust warmed air while the vehicle refrigerator operates from the inside of the console space 4. The exhaust port 6 may face the assistant driver. A grill may be provided in each of the suction port 5 and the exhaust port 6 to prevent user's hand from being inserted and thereby to provide safety, prevent an object, which falls from an upper side, from being introduced, and allow air to be exhausted to flow downward so as not to be directed to the person.

FIG. 3 is a schematic perspective view illustrating the inside of the vehicle refrigerator.

Referring to FIG. 3, the vehicle refrigerator 7 includes a refrigerator bottom frame 8 supporting parts, a machine room 200 provided in a left side of the refrigerator bottom frame 8, and a cavity 100 provided in a right side of the refrigerator bottom frame 8. The machine room 200 may be covered by a machine room cover 700, and an upper side of the cavity 100 may be covered by the console cover 300 and a door 800.

The machine room cover 700 may not only guide a passage of the cooling air, but also prevent foreign substances from being introduced into the machine room 200.

A controller 900 may be disposed on the machine room cover 700 to control an overall operation of the vehicle refrigerator 7. Since the controller 900 is installed at the corresponding position, the vehicle refrigerator 7 may operate without problems in a proper temperature range in a narrow space inside the console space 4.

That is to say, the controller 900 may be cooled by air flowing through a gap between the machine room cover 700 and the console cover 300 and separated from an inner space of the machine room 200 by the machine room cover 700. Thus, the controller 900 may not be affected by heat within the machine room 200.

The console cover 300 may not only cover an opened upper portion of the console space 4, but also cover an upper end edge of the cavity 100. A door 800 may be further installed on the console cover 300 to allow the user to cover an opening through which products are accessible to the cavity 100. The door 800 may be opened by using rear portions of the console cover 300 and the cavity 100 as hinge points.

Here, the opening of the console cover 300, the door 800, and the cavity 100 may be performed by conveniently manipulating the door 800 by the user because the console cover 300, the door 800, and the cavity 100 are horizontally disposed when viewed from the user and also disposed at a rear side of the console.

A condensation module 500, a dryer 630, and a compressor 201 may be successively installed in the machine room 200 in a flow direction of the cooling air. A refrigerant conduit 600 for allowing the refrigerant to smoothly flow is provided in the machine room 200. A portion of the refrigerant conduit 600 may extend to the inside of the cavity 100 to supply the refrigerant. The refrigerant conduit 600 may extend to the outside of the cavity 100 through the upper opening through which the products are accessible to the cavity 100.

The cavity 100 has an opened top surface and five surfaces that are covered by a vacuum adiabatic body 101. The cavity 100 may be thermally insulated by an individual vacuum adiabatic body or at least one or more vacuum adiabatic bodies communicating with each other. The cavity 100 may be provided by the vacuum adiabatic body 101. Also, the cavity 100 through which the products is accessible through one surface opened by the vacuum adiabatic body 101 may be provided.

The vacuum adiabatic body 101 may include a first plate member 10 providing a boundary of a low-temperature inner space of the cavity 100, a second plate member 20 providing a boundary of a high-temperature outer space, and a conductive resistance sheet 60 blocking heat transfer between the plate members 10 and 20. Since the vacuum adiabatic body 101 has a thin adiabatic thickness to maximally obtain adiabatic efficiency, the cavity 100 having large capacity may be realized.

An exhaust and getter port for the exhaust of the inner space of the vacuum adiabatic body 101 and for installing a getter that maintains the vacuum state may be provided on one surface. The exhaust and getter port (or vacuum port) 40 may provide the exhaust and getter together to more contribute to miniaturization of the vehicle refrigerator 7.

An evaporation module 400 may be installed in the cavity 100. The evaporation module 400 may forcibly blow evaporation heat of the refrigerant introduced into the cavity 100 through the refrigerant conduit 600 into the cavity 100. The evaporation module may be disposed at a rear side within the cavity 100. Thus, the front space within the cavity, which is used by the user facing a front side, may increase even larger.

FIG. 4 is a view illustrating a connection relationship between the machine room and the cavity.

Referring to FIG. 4, the evaporation module 400 is accommodated into the cavity 100. That is to say, the evaporation module 400 is disposed in the inner space of the cavity 100 having the vacuum adiabatic body 101 as an outer wall. Thus, the machine room may be improved in space efficiency, and the cavity 100 may increase in inner space. This is because the vacuum adiabatic body achieves high adiabatic performance even though the vacuum adiabatic body has a thin thickness.

The refrigerant conduit 600 guiding the refrigerant into the evaporation module 400 is guided to the evaporation module 400 by passing over the top surface of the cavity 100.

It may be considered that the refrigerant conduit 600 passes through the vacuum adiabatic body 101 to reduce a volume thereof. However, since the vehicle has many vibration, and the inside of the vacuum adiabatic body 101 is maintained in considerably high vacuum state, the sealing of the contact portion between the refrigerant conduit 600 and the vacuum adiabatic body 101 may be damaged. Thus, it is not preferable that the refrigerant conduit 600 passes through the vacuum adiabatic body 101. For example, air leakage due to vibration of the vehicle may occur. If the air leaks from the vacuum adiabatic body, it may be expected that the adiabatic effect is significantly deteriorated.

The evaporation module 400 may be preferably installed to come into contact with the hinge point of the door within the cavity 100, i.e., a rear surface within the cavity 100. This is because a path that is necessary for allow the refrigerant conduit 600 to extend up to the evaporation module 400 is as short as possible for ensuring the internal volume of the cavity 100. Also, the inner volume of the cavity may be maximized.

It is more preferable that the refrigerant conduit 600 passing over the vacuum adiabatic body 101 passes through the hinge point of the door. If the evaporation module 400 is out of the hinge point of the door, the capacity of the cavity and the low-temperature energy may be lost due to the extension of the refrigerant conduit 600 and the adiabatic property of the refrigerant conduit 600.

The condensation module 500 may be coupled by a rear coupling unit of the machine room bottom frame 210. Air suctioned through the condensation module 500 may cool the compressor 201 and then be discharged downward from the compressor 201.

The machine room cover 700 may be coupled to a left side of the cavity 100 to cover the machine room 200. An air flow for cooling may occur in an upper side of the machine room cover 700, and the controller 900 may be provided on the cooling passage to perform sufficient cooling action.

FIG. 5 is an exploded perspective view of the evaporation module.

Referring to FIG. 5, the evaporation module 400 includes a rear cover 430 disposed at a rear side to accommodate the parts and a front cover 450 disposed at a front side of the rear cover 430 to face the cavity 100. A space may be provided in the evaporation module 400 by the front cover 450 and the rear cover 430 to accommodate the parts in the space.

In the space defined by the front cover 450 and the rear cover 430, an evaporator 410 is disposed at a lower side, and an evaporation fan 420 is disposed at an upper side. A centrifugal fan that is capable of being mounted in a narrow space may be used as the evaporation fan 420. More particularly, a sirocco fan including a fan inlet 422 having a large area to suction air and a fan outlet 421 blowing the air at a high rate in a predetermined discharge direction in a narrow space may be used as the evaporation fan 420.

Since the sirocco fan may be driven with low noise, it is also possible to use the sirocco fan in a low noise environment.

The air passing through the evaporator 410 is suctioned into the fan inlet 422, and the air discharged from the fan outlet 421 is discharged to the cavity 100. For this, a predetermined space may be provided between the evaporation fan 420 and the rear cover 430.

A plurality of compartments may be provided in the rear cover 430 to accommodate the parts. Particularly, the evaporator 410 and the evaporation fan 420 are disposed in a first compartment 431 to guide a flow of cool air. A lamp 440 may be disposed in a second compartment 432 to brighten the inside of the cavity 100 so that the user looks the inside of the cavity 100. A temperature sensor 441 is disposed in a fourth compartment 434 to measure an inner temperature of the cavity 100 and thereby to control the vehicle refrigerator.

When the temperature sensor 441 disposed in the fourth compartment 434 measures the inner temperature of the cavity 100, the flow in the cavity may not have a direct influence on the third temperature sensor 441. That is, the cold air of the evaporator 410 may not have a direct influence on the third compartment 433.

Although the third compartment 433 is removed in some cases, the third compartment 433 may be provided to prevent an error of the inner temperature of the cavity 100 from occurring by conductive heat.

The fourth compartment 434 and the temperature sensor 441 are disposed at left upper end, i.e., an apex of the evaporation module 400, which is farthest from the evaporator 410. This is to prevent the cold air from having an influence on the evaporator 410. That is to say, to prevent the cold air of the evaporator from having a direct influence on the fourth compartment 434 through the conduction, the fourth compartment 434 and the temperature sensor 441 may be isolated from the first compartment 431 by other compartments 432 and 433.

An inner structure of the first compartment 431 will be described in detail.

A fan housing 435 having a circular shape so that the evaporation fan 420 is disposed is provided at an upper side of the first compartment 431, and an evaporator placing part (or evaporator seat) 437 on which the evaporator 410 is placed is provided at a lower side of the first compartment 431.

A conduit passage 436 is provided in a left side of the fan housing 435. The conduit passage 436 may be a portion through which a refrigerant conduit 600 passing over the vacuum adiabatic body 101 is guided into the evaporation module 400 and be provided in a left corner portion of the evaporation module 400. The refrigerant conduit 600 may include two conduits that are surrounded by the adiabatic member so that the two conduits through which the evaporation module 400 is inserted and withdrawn are heat-exchanged with each other. Thus, the conduit passage 436 may have a predetermined volume. The conduit passage 436 may vertically extend from a left side of the evaporation module 400 to improve space density inside the evaporation module 400.

As described above, the evaporator 410 and the evaporation fan 420 are provided in the rear cover 430 to perform the cooling of air within the cavity and the circulation of air within the cavity.

The front cover 450 has an approximately rectangular shape like the rear cover 430. A cold air inflow hole 451 guiding the air inflow to the lower side of the evaporator 410 and a cold air discharge port 452 aligned with the fan outlet 421 is defined in a lower portion of the front cover 450. The cold air discharge port 452 may have a shape of which an inner surface is smoothly bent forward to discharge air, which is discharged downward from the evaporation fan 420, forward.

The front cover 450 aligned with the second compartment 432 may be opened, or a window 453 may be provided on the portion of the front cover 450 so that light of the lamp 440 is irradiated into the cavity 100.

A air vent hole 454 is defined in the front cover 450 aligned with the fourth compartment 434. The air discharged from the cold air discharge port 452 circulates inside the cavity 100 and then is introduced into the air vent hole 454. Thus, the inner temperature of the cavity 100 may be more accurately detected. For example, the inner temperature of the cavity 100 may be erroneously measured by a large amount of cold air discharged from the cold air discharge port 452. Here, the cold air may cause a static temperature inside the cavity to have a direct influence without affecting the cold air blown from the evaporation fan 420. For this, the fourth compartment 434 may be disposed at the uppermost right end of the rear surface of the cavity.

FIG. 6 is a view for explaining an air flow outside a machine room of the vehicle refrigerator.

Referring to FIG. 6, air introduced into the suction port 5 moves to a left side of the vehicle refrigerator through a space between the vacuum adiabatic body 101 defining a front wall of the cavity 100 and a front surface of the console space 4. Since a heating source is not provided at a right side of the vehicle refrigerator, the suction air may be maintained at its original temperature.

The air moving to the left side of the vehicle refrigerator may be changed in direction to a rear side to move along a top surface of the machine room cover 700 outside the machine room 200.

To smoothly guide the air flow, the machine room cover 700 may have a height that gradually increases backward from the front surface 710. Also, to provide a region in which the controller 900 is disposed, and prevent the parts within the machine room from interfering in position with each other, a stepped part may be disposed on the top surface of the machine room 700.

In detail, a first stepped part 732, a second stepped part 733, and a third stepped part 735 may be successively provided backward from the front surface. A controller placing part 734 having the same height as the third stepped part is disposed on the second stepped part 733. Due to this structure, the controller 900 may be disposed in parallel to the third stepped part 735 and the controller placing part 734.

The air moving along the top surface of the machine room cover 700 may cool the controller 900. When the controller is cooled, the air may be slightly heated.

The air moving up to the rear side of the machine room cover 700 flows downward. An opened large cover suction hole is defined in the rear surface of the machine room. For this, a predetermined space may be provided between the rear surface of the machine room cover 700 and the rear surface of the console space 4.

Thereafter, the air cooling the inside of the machine room cover 700 is discharged to the outside through the bottom of the machine room.

As described above, the evaporation module 400 is disposed at a rear side of the cavity 100, and the refrigerant conduit 600 supplying the refrigerant into the evaporation module 400 passes over the cavity 100. In addition, a hinge of the door 800 and the evaporation module 400 are placed on the rear side of the cavity so that a rear portion of the cavity is vulnerable to thermal insulation.

To solve this limitation, a hinge part adiabatic member is provided. The hinge part adiabatic member 470 performs an adiabatic action on an upper portion of the evaporation module 400, between the evaporation module 400 and a rear wall of the cavity 100, and a contact part between a regeneration adiabatic member 651 inserted into the cavity and an inner space of the cavity. A rear surface and side surface of the evaporation module 400 may be thermally insulated by the cavity. The cavity may be insulated by the third space provided in a vacuum state.

As described above, the console cover 300 is further provided above the hinge part adiabatic member 470 to lead to complete heat insulation.

FIG. 7 is a perspective view of the hinge part adiabatic member.

Referring to FIG. 7, the hinge part adiabatic member 470 includes the inner support 473 covering the regeneration adiabatic member 651 and inserted into the inner bearing 373, the outer support 472 inserted into the outer bearing part 372, and the connection bar 471 connecting the supports 472 and 473 to each other and thermally insulating an upper portion of the evaporation module 400.

Since the supports 472 and 473 are inserted into the bearing parts 372 and 373, the hinge part adiabatic member and the console cover 300 may be integrated with each other. Also, since the console cover 300 is installed, the hinge part adiabatic member 470 may be fixed with respect to the cavity 100. That is to say, the supports 472 and 473 may allow the parts in a rear space within the cavity 100 to come into closely contact with each other while supporting the evaporation module 400. Thus, the parts may come into strongly contact with each other to prevent the cold air from leaking. Also, the hinge action of the door 800 may be more confirmed.

Each of the supports 472 and 473 may have a structure that gradually decreases in cross-sectional area toward an end thereof so that the supports 472 and 473 are inserted into the bearing parts 372 and 373.

The inner support 473 may have a thickness greater than that of the outer support 472. This is because heat loss may occur by the regeneration adiabatic member 651. It is understood that there is high possibility of leakage of cold air by the regenerated adiabatic member 651 passing over the vacuum adiabatic member.

A regeneration adiabatic member seating part or seat 476 having a shape that properly matches an outer appearance of the regeneration adiabatic member 651 is disposed on an inner surface of the inner support 473. Thus, the regeneration adiabatic member may be bent in a smooth arc shape. A lower end surface of the regeneration adiabatic member seating part 476 may be placed on the upper end of the vacuum adiabatic body 101. Thus, a vertical position relationship between the hinge part adiabatic member 470 and the cavity 100 may be clear, and a gap between the parts may not occur.

An inner fitting part 477 further extending downward from a rear portion of the regeneration adiabatic member seating part 476 may be further provided. The inner fitting part 477 may correspond to an inner surface of the vacuum adiabatic body 101, and thus, the position relationship of the hinge part adiabatic member 470 in a front and rear direction may be more clearly maintained. The outer fitting part 478 corresponding to the inner fitting part 477 may also be provided on the outer support 472.

A part on which the evaporation module 400 is seated to be fitted is provided on the connection bar 471. Particularly, a cover seating part (or cover seat) 488, a fan housing seating part (or fan housing seat) 474, and a second compartment seating part (or second compartment seat) 475 may be provided. The relationship in position between the hinge part adiabatic member 470 and the cavity in the left and right direction may be clear by the cover seating part 488, each of the fan housing seating part 474 and the second compartment seating part 475 is provided to correspond to an upper shape of the evaporation module 400 and thereby to prevent the cold air from leaking through the contact part between the evaporation module and the hinge part adiabatic member.

According to the above-described constituents, the hinge part adiabatic member may prevent external air from leaking through a boundary with the contact part of various constituents coming into contact with the hinge part adiabatic member to enhance the adiabatic performance with respect to the portion that is vulnerable to heat leakage.

FIGS. 8 to 11 are plan, front, bottom, and left views of the hinge part adiabatic member.

Referring to FIGS. 8 to 11, the configuration of the hinge part adiabatic member and an action of each constituent may be more clearly understood.

An outer fitting groove 480 and an inner fitting groove 479 are provided inside the supports 472 and 473, respectively. This is done for accommodating a support portion of the console cover that becomes thicker to accommodate the hinge shaft of the door in the bearing parts 372 and 373 provided on the console cover 300.

The second compartment seating part 475 may have a recessed structure and provide a path through which a structure such as a wire that is led out of the evaporation module 400 passes to the outside.

A skirt 478 further extends downward to the inside of the regeneration adiabatic member seating part 476. The skirt 478 may be a portion that further extends downward to help the perforation of the regeneration adiabatic member 651 that enters into the cavity 100.

FIG. 12 is an exploded perspective view illustrating a relationship between the evaporation module and a hinge part adiabatic member.

Referring to FIG. 12, an inner support 473 covering the regeneration adiabatic member 651 and a conduit path 436 to improve an adiabatic effect is disposed on the hinge part adiabatic member 470.

An outer support 472 covering the compartment to insulate the outside is disposed on the hinge part adiabatic member 470.

A connection bar 471 connecting the supports 472 and 473 to each other and thermally insulating an upper portion of the evaporation module 400 is provided.

The hinge part adiabatic member 470 may support the evaporation module 400 at the upper end to come into closely contact with each other while supporting the evaporation module 400. Thus, the parts may come into strongly contact with each other to prevent the cold air from leaking. Also, the bearing parts 372 and 373 and the supports 472 and 473 may be fitted with respect to each other to more firmly support the door 800.

The inner support 473 may have a thickness greater than that of the outer support 472. As described above, it is intended to prevent the heat loss that may occur due to the regeneration adiabatic member 651.

For this, the vertical position relationship between the hinge part adiabatic member 470 and the cavity 100 may be clear, and a gap between the parts may not occur to more reduce the heat loss by the regeneration adiabatic member seating part 476 provided on the inner surface of the inner support 473.

The inner fitting part 477 and the outer fitting part 478 may be provided to more reduce the cold air leakage from the cavity.

The fitting of the upper ends of the vacuum adiabatic body 101 and the evaporation module 400, which constitute the cavity 100, may be accurately performed by the cover seating part 488, the fan housing seating part 474, and the second compartment seating part 475.

A wire may pass between the upper ends of the hinge part adiabatic member 470 and the evaporation module so that current passes through the sensor and the light source, which are provided in the evaporation module. Therefore, an operation of the evaporation module may be realized.

FIG. 13 is a cross-sectional view of the evaporation module, in which the left and right are respectively the rear and the front.

Referring to FIG. 13, the air flow inside the evaporation module 400 may be illustrated by the arrows.

In detail, a flow of cold air will be described. The air introduced through the cold air inlet 451 on the lower side of the front cover is cooled while passing through the evaporator 410. The cooled air flows to the rear of the evaporation fan 420, is introduced through the fan inlet 422 on the rear surface of the evaporation fan 420, and is discharged downward toward the fan outlet 421 by centrifugal force. A sirocco fan may be used as the evaporation fan, and a shape of the fan housing and the positioning of the fan may be adjusted to set a direction of the discharge port downward.

The air discharged from the fan outlet 421 is changed in direction into a front side through the cold air discharge port 452 and then is discharged to the inside of the cavity 100. A cold air discharge guide 456 having a shape that is smoothly bent so that the air discharged downward is smoothly bent forward and discharged may be provided in the cold air discharge port 452.

Preferably, the inside of the cavity may be uniformly cooled.

For example, if the containers on one side and the other are cooled to different temperatures, a large number of people may not enjoy cold drinks together. In this point of view, it is important to note where the cold air discharge port 452 is formed on the front cover 450 and which direction the cold air is discharged.

FIG. 14 is a schematic front view illustrating the inside of the cavity so as to explain a position of the cold air discharge port.

Referring to FIG. 14, the cool air discharge port 452 is disposed to extend in the left and right direction from a substantially middle height inside the cavity.

That is, when the inside of the cavity is divided into three parts, the cold air discharge port 452 is disposed at one-third portion of the middle. As a result, the air discharged from the middle portion spreads through the inner obstacles and then flows downward into the evaporation module 400. Also, the cold air discharge port 452 may be provided to extend horizontally and thus be widely spread in the left and right direction so that the air is uniformly spread into the cavity 100.

More preferably, the cold air discharge port 452 may be disposed from the bottom of the cavity 100 at one-three point from one point.

This is because the cold air discharged from the cold air discharge port 452 collides with the storage container disposed inside the cavity. Here, since an upper portion of the storage container 498 is smaller than the body, the cool air may flow to the front of the cavity 100. On the contrary, since the body of the storage container 498 has a small gap and thus high flow resistance, it is difficult that the cold air flows to the front of the cavity 100.

That is, since the cold air discharge port 452 is disposed between one-two point and two-three point from the bottom of the cavity 100, a flow of the cold air flowing to the front of the cavity 100 over the neck portion of the storage container and a flow of the cold air that is stopped at the rear side of the cavity 100 by colliding with the neck portion of the storage container may be provided together. Thus, an effect that the front and rear sides inside the cavity 100 are cooled together, and thus, all the products placed in the cavity 100 may be uniformly cooled.

If other products do not interfere with each other, the cold air discharge port 452 may be disposed at one-two point in the left and right direction. Thus, the cold flowing over the storage container 498, i.e., the cold air flowing over the spacing part between the storage containers 498 and the cold air does not flow over the spacing part may be distinguished from each other. It is conceivable that two rows, i.e., two beverage containers are accommodated in the cavity. This is a desirable form considering a size of the beverage container and considering the number of beverage containers that are provided in a narrow console space.

FIG. 15 is a view illustrating a discharge direction of cold air through the cold air discharge port, and FIGS. 16 to 18 are views for explaining experimental results of FIG. 15. Here, a horizontal axis represents a cooling time, and a vertical axis represents a temperature.

In FIG. 15, ① denote a case in which the cold air discharge port 452 is installed at an approximately central portion when viewed from the upper, lower, left, and right sides of the rear surface of the cavity to discharge the cold air to the right side with respect to FIG. 15, ② denote a case in which the cold air discharge port 452 is installed at an approximately central portion when viewed from the upper, lower, left, and right sides of the rear surface of the cavity to discharge the cold air upward directly with respect to FIG. 15, and ③ denotes a case in which the cold air discharge port 452 is installed at an upper side when viewed from the upper and lower sides of the rear surface of the cavity and at the right side when viewed from the left and right of the rear surface of the cavity to discharge the cold air to the left side with respect to FIG. 15.

Also, there are four storage containers 498 placed inside the cavity 100 and assigned different numbers depending on their positions.

Referring to FIG. 16, it is seen that the container ① disposed at the front right side is quickly cooled, and it take about 22 minutes to cool the container by about 10 degrees. Then, it is seen that the cooling is delayed in order of ②, ③, and ④.

In this case, it is confirmed that a deviation in cooling rate of the containers ①, ②, ③, and ④ is excessive large.

Referring to FIG. 17, it is seen that the container ③ disposed at the front left side is quickly cooled, and it take about 24 minutes to cool the container by about 10 degrees. Then, it is seen that the cooling is delayed in order of ④, ①, and ②. It is confirmed that although the cooling rate of the storage container that is most rapidly cooled is slowed as compared with the case of FIG. 16, the deviation in cooling rate of the storage containers is reduced.

In this case, it is considered that the storage containers ③ and ④ are more quickly cooled because of the property of the evaporation fan 420 provided as a centrifugal fan. In the case of FIG. 17, the present position is close to a position of the driver, and an effect of enhancing the driver's convenience may be obtained.

Referring to FIG. 18, it is seen that the container ④ disposed at the front right side is quickly cooled, and it take about 28 minutes to cool the container by about 10 degrees. Then, it is seen that the cooling is delayed in order of ②, ③, and ①. It is confirmed that the cooling rate of the storage container that is most rapidly cooled is more slowed as compared with the case of FIG. 17, and the deviation in cooling rate of the storage containers is more reduced.

Referring to the case of each experiment described above, it is possible to obtain a uniform cooling effect in the cavity 100, and simultaneously, to achieve a rapid cooling effect at a specific position. It is most preferable to directly discharge the air toward the front side of the cavity 100 together with the up/down and left/right positions of the cold air discharge port 452 shown in FIG. 14.

It is also important to ensure that the specific storage container is quickly cooled, with the entire inner space of the cavity 100 being allowed to cool uniformly. For example, it is important for the driver to be able to quickly cool down one storage container he or she will eat while driving alone.

An embodiment for accomplishing the uniform cooling inside the cavity together with the rapid cooling of a specific storage container is presented below.

FIG. 19 is a view when uniform cooling is performed according to an embodiment, and FIG. 20 is a view when quick cooling is performed according to an embodiment.

Referring to FIGS. 19 and 20, a container holder 460 for supporting a storage container is rotatably supported with respect to at least at one of a rear cover 430 and a front cover 450 at the periphery of the cold air discharge port 452.

The container holder 460 is provided with an extension 463 which is supported by sides of the covers 430 and 450 to extend, a container holding part 462 bent from an end of the extension 463 to allow a user to hold the storage container 498, and a holder handle 461 held by hands to allow the user to rotate or take out the container holder 460.

A cold air discharge louver 457 is disposed in the cold air discharge port 452, and the cold air discharge louver 457 is rotatable together with the rotation of the container holder 460.

For example, in the state in which the container holder 460 is folded into the evaporation module 400 (see FIG. 19), the louver 457 may be positioned so that the cold air passing through the cold air discharge port 452 flows straightly. In the state in which the container holder 460 is spread out of the evaporation module 400 (see FIG. 20), the louver 457 may rotate so that the cold air passing through the cold air discharge port 452 flows to the storage container 498.

The cold air discharge louver 457 may be disposed inside the cold air discharge guide 456.

A connection structure between the container holder 460 and the cold air discharge louver 457 will be described with reference to a configuration view of the cold air discharge louver illustrated in FIG. 21.

Referring to FIG. 21, the container holder 460 may rotate by a holder support shaft 466 with respect to one point of the covers 430 and 450.

Also, the cold air discharge louver 457 may rotate by a louver support shaft 468 with respect to the other point of the covers 430 and 450. The plurality of cold air discharge louvers 457 are connected to each other by a parallel linkage 465 on the other side where the louver support shaft 468 is provided. Thus, when one cold air discharge louver 457 rotates, the other cold air discharge louver 457 may also rotate by the parallel linkage 465.

A slit 467 is defined in the container holder 460, and an insertion bar 469 extending from the louver 457 may be inserted into the slit 467.

According to the above-described constituents, the following operation may be performed.

The user holds the holder handle 461 of the container holder 460 to rotate the holder handle 461. The user anticipates an action to be withdrawn. When the container holder 460 rotates about the holder support shaft 466, the insertion bar 469 moves along the slit 467. Since the insertion bar 469 is provided as one body with the louver 457, the louver 457 rotates about the louver support shaft 468. When one louver 457 rotates, all the louvers 457 linked through the parallel linkage 465 may rotate together.

Since the rotation of the container holder 460 and the rotation of the louver 457 are linked with each other, when the louver 457 is disposed to be inclined, an angle of the louver 457 may be directed to a side at which the container holder 460 supports the storage container 498. That is, the angle may be directed to a side to which the container holding part 462 is provided.

Thus, the louver 457 may be directed to the storage container 498 so that the cold air flows to the storage container 498. Thus, the storage container supported by the container holder 460 may be quickly cooled because the cold air is directly injected.

In the case where there are many inertia directions and vibrations as in the vehicle, cooling may be performed in a state where the position of the storage container is supported by the support operation by the container holder 460.

Through the above-described operation, the rotation of the container holder 460 and the rotation of the louver 467 may be linked to each other. However, the size and angle of each part shown in FIG. 21 may be specifically varied according to the size and rotation angle of the container, and the drawings are only examples.

The rapid cooling with respect to a specific position inside the cavity is not limited to the above example. FIGS. 22 and 23 are views illustrating another example of the cold air discharge louver.

Referring to FIGS. 22 and 23, a guider 470 having a predetermined space is provided on an outlet end of the cold air discharge guide 456, and a slider 475 guided by the guider 470 may be provided. Also, a vertical or straight louver 471 that is directed to the front of the cavity and an inclined louver 472 that is inclined in a specific direction may be provided together on the slider 475. The direction in which the inclined louvers 472 are directed may be a side close to the driver's side. For example, the direction may be a rear right side of the cavity.

When the slider 475 moves, uniform cooling with respect to the cavity may be performed through alignment of the vertical louver 470 with the discharge end of the cold air discharge guide 465 as illustrated in FIG. 22. In this case, the cold air may be discharged in the vertical direction, i.e., the front of the cavity by the guidance of the vertical louver 470.

On the other hand, the quick cooling with respect to the cavity may be performed through alignment of the inclined louver 472 with the discharge end of the cold air discharge guide 465 as illustrated in FIG. 23. In this case, the cold air may be discharged in the inclined direction, i.e., the rear of the cavity by the guidance of the inclined louver 472. In this case, a specific storage container may be quickly cooled.

The above-described configuration has two modes: a uniform cooling mode in which a large number of storage containers are required to be cooled such as when there are a plurality of passengers, and a rapid cooling mode in which a small number of storage containers are required to be cooled such as when only the driver boarded to maximize an effect of actively performing the two modes.

The structure and action of the vacuum adiabatic body 101 will be described in more detail.

FIG. 24 is a view illustrating an internal configuration of a vacuum adiabatic body according to various embodiments.

First, referring to FIG. 24a, a vacuum space part 50 is provided in a third space having a different pressure from first and second spaces, preferably, a vacuum state, thereby reducing adiabatic loss. The third space may be provided at a temperature between the temperature of the first space and the temperature of the second space. A constituent that resists heat transfer between the first space and the second space may be referred to as a heat resistance unit. Hereinafter, all various constituents may be applied, or the various constituents may be selectively applied. In a narrow sense, a constituent that resists heat transfer between the plate members may be referred to as a heat resistance unit.

The third space is provided as a space in the vacuum state Thus, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit (or support structure) 30 may be provided to reduce the deformation of the vacuum space part 50. The supporting unit 30 includes bars 31. The bars 31 may extend in a direction substantially vertical to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20.

The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 may be diffused through the support plate 35.

A material of the supporting unit 30 may include a resin selected from the group consisting of PC, glass fiber PC, low outgassing PC, PPS, and LCP so as to obtain high compressive strength, low outgassing and water absorption, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20.

A product having a low emissivity may be preferably used as the material of the radiation resistance sheet 32. In an embodiment, an aluminum foil having an emissivity of 0.02 may be used as the radiation resistance sheet 32. Also, at least one sheet of radiation resistance sheet 32 may be provided at a certain distance so as not to contact each other. At least one radiation resistance sheet may be provided in a state in which it contacts the inner surface of the first or second plate member 10 or 20. Even when the vacuum space part 50 has a low height, one sheet of radiation resistance sheet may be inserted. In case of the vehicle refrigerator 7, one sheet of radiation resistance sheet may be inserted so that the vacuum adiabatic body 101 has a thin thickness, and the inner capacity of the cavity 100 is secured.

Referring to FIG. 24b, the distance between the plate members is maintained by the supporting unit 30, and a porous substance 33 may be filled in the vacuum space part 50. The porous substance 33 may have a higher emissivity than the stainless material of the first and second plate members 10 and 20. However, since the porous substance 33 is filled in the vacuum space part 50, the porous substance 33 has a high efficiency for resisting the radiation heat transfer.

In this embodiment, the vacuum adiabatic body may be fabricated without using the radiation resistance sheet 32.

Referring to FIG. 24c, the supporting unit 30 maintaining the vacuum space part 50 is not provided. Instead of the supporting unit 30, the porous substance 33 is provided in a state in which it is surrounded by a film 34. In this case, the porous substance 33 may be provided in a state in which it is compressed so as to maintain the gap of the vacuum space part 50. The film 34 is made of, for example, a PE material, and may be provided in a state in which holes are formed therein.

In this embodiment, the vacuum adiabatic body may be fabricated without using the supporting unit 30. In other words, the porous substance 33 may simultaneously serve as the radiation resistance sheet 32 and the supporting unit 30.

FIG. 25 is a view of a conductive resistance sheet and a peripheral portion of the conductive resistance sheet.

Referring to FIG. 25a, the first and second plate members 10 and 20 are to be sealed so as to vacuum the interior of the vacuum adiabatic body. In this case, since the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts (or seals) 61 at which both ends of the conductive resistance sheet 60 are sealed to defining at least one portion of the wall for the third space and maintain the vacuum state. The conductive resistance sheet 60 may be provided as a thin foil in unit of micrometer so as to reduce the amount of heat conducted along the wall for the third space. The sealing parts 61 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction may be further reduced.

A change in temperature occurs along the conductive resistance sheet 60. Therefore, in order to block heat transfer to the exterior of the conductive resistance sheet 60, a shielding part (or shield) 62 may be provided at the exterior of the conductive resistance sheet 60 such that an adiabatic action occurs. In other words, in the vehicle refrigerator 7, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur.

In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous substance contacting an outer surface of the conductive resistance sheet 60, may be provided as an adiabatic structure, e.g., a separate gasket, which is placed at the exterior of the conductive resistance sheet 60, or may be provided as the console cover 300 disposed at a position facing the conductive resistance sheet 60.

A heat transfer path between the first and second plate members 10 and 20 will be described. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various design dimensions. For example, the supporting unit may be changed such that the first and second plate members 10 and 20 may endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as about 19.6 mW/mK.

By performing a relative analysis on heat transfer amounts of the vacuum adiabatic body of the embodiment, a heat transfer amount by the gas conduction heat ③ may become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Figure 1.

$$eK_{solid\ conduction\ heat} > eK_{radiation\ transfer\ heat} > eK_{gas\ conduction\ heat}$$ Math Figure 1

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area (m2) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and may be obtained in advance). For the supporter conduction heat, a conductive calorific value may be obtained through a temperature difference ($\Delta T$) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous substance is provided inside the vacuum space part 50, porous substance conduction heat ⑤ may be a sum of the supporter conduction heat ② and the radiation transfer heat ④. The porous substance conduction heat ⑤ may be changed depending on various variables including a kind, an amount, and the like of the porous substance.

In the second plate member, a temperature difference between an average temperature of the second plate and a temperature at a point at which a heat transfer path passing through the conductive resistance sheet 60 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body may be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having strength (N/m2) of a certain level may be used.

Referring to FIG. 25b, this configuration is the same as that of FIG. 24a except that portions at which the first plate member 10, the second plate member 20 are coupled to the conductive resistance sheet 60. Thus, the same part omits the description and only the characteristic changes are described in detail.

Ends of the plate members 10 and 20 may be bent to the second space having a high temperature to form a flange part 65. A welding part 61 may be disposed on a top surface of the flange part 65 to couple the conductive resistance sheet 60 to the flange part 65. In this embodiment, the worker may perform welding while facing only any one surface. Thus, since it is unnecessary to perform two processes, the process may be convenient.

It is more preferable to apply the case in which welding of the inside and the outside are difficult as illustrated in FIG. 25a because a space of the vacuum space part 50 is narrow like the vehicle refrigerator 7.

FIG. 26 is a graph illustrating results obtained by observing a time and a pressure in a process of exhausting the inside of the vacuum adiabatic body when a supporting unit is used.

Referring to FIG. 26, in order to create the vacuum space part 50 to be in the vacuum state, a gas in the vacuum space part 50 is exhausted by a vacuum pump while evaporating a latent gas remaining in the parts of the vacuum space part 50 through heating. However, if the vacuum pressure reaches a certain level or more, there exists a point at which the level of the vacuum pressure is not increased any more ($\Delta t1$). After that, the getter is activated by disconnecting the vacuum space part 50 from the vacuum pump and applying heat to the vacuum space part 50 ($\Delta t2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{-6}$ Torr.

In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10^{-6}$ Torr.

FIG. 27 is a graph obtained by comparing a vacuum pressure with gas conductivity.

Referring to FIG. 27, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It may be seen that, since the size of the gap is small at a point corresponding to a typical effective heat transfer coefficient of 0.0196 W/mK, which is provided to an adiabatic material formed by foaming polyurethane, the vacuum pressure is $2.65 \times 10^{-1}$ Torr even when the size of the gap is 2.76 mm. Meanwhile, it may be seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr may be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit but provided with the porous substance, the size of the gap ranges from a few micrometers to a few hundreds of micrometers. In this case, the amount of radiation heat transfer is small due to the porous substance even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

When the supporting unit and the porous substance are provided together in the vacuum space part, a vacuum pressure may be created and used, which is middle between the vacuum pressure when only the supporting unit is used and the vacuum pressure when only the porous substance is used.

Hereinafter, another embodiment will be described.

In above-described embodiment, the refrigerator applied to the vehicle has been mainly described. However, the embodiment of the present disclosure is not limited thereto. For example, the ideas of the present disclosure may be applied to a warming apparatus and a refrigerating or warming apparatus. Of course, the embodiment of the present disclosure is not limited to a vehicle, but may be applied to any apparatus that generates a desired temperature of a product. However, it would be preferable for the vehicle refrigerator.

Particularly, in the case of the warming apparatus, a direction of the refrigerant may be configured to be opposite to that of the refrigerator. In the case of the refrigerating or warming apparatus, four sides that reverse the direction of the refrigerant may be installed on the refrigerant passage according to whether the refrigerant operates as a refrigerator or a warming apparatus.

The condensation module may be referred to as a first heat exchange module, and the evaporation module may be referred to as a second heat exchange module regardless of the change of the refrigerator and the warming apparatus. Here, the first and second meanings denote the division of the heat exchange module and may be exchanged with each other.

INDUSTRIAL APPLICABILITY

According to the embodiments, the vehicle refrigerator that receives only power from the outside and is independent apparatus may be efficiently realized.

The invention claimed is:

1. A vacuum adiabatic body comprising:
    a first plate that defines at least a portion of a first side of a wall adjacent to a first space having a first temperature, the first space forming a cavity;
    a second plate that defines at least a portion of a second side of the wall adjacent to a second space having a second temperature different from the first temperature;
    a seal that seals the first plate and the second plate to provide a third space between the first plate and the second plate that has a third temperature between the first temperature and the second temperature and the third space is in a vacuum state;
    a support that supports the first and second plates and is provided in the third space;
    a thermal insulator that reduces heat transfer between the first plate and the second plate;
    a vacuum port through which a gas in the third space is discharged; and
    a heat exchange module that contacts an inner surface of the cavity, wherein the heat exchange module comprises a heat exchanger and a fan configured to cycle air through the heat exchanger and the cavity.

2. The vacuum adiabatic body according to claim 1, wherein the heat exchanger is an evaporator, and the heat exchange module further comprises a first compartment in which the fan and the evaporator are provided.

3. The vacuum adiabatic body according to claim 2, wherein the heat exchange module comprises a second compartment that is partitioned from the first compartment and configured to accommodate a temperature sensor.

4. The vacuum adiabatic body according to claim 3, further comprising a third compartment that is partitioned from the first compartment and the second compartment and configured to accommodate a lamp,
    wherein the third compartment is provided between the first compartment and the second compartment.

5. The vacuum adiabatic body according to claim 3, wherein the second compartment is at a first side of the first compartment, and a conduit passage, through which a refrigerant conduit passes, is provided at a second side, opposite the first side.

6. The vacuum adiabatic body according to claim 2, wherein the fan comprises a centrifugal fan and suctions air from a rear side of the evaporator to discharge the air downward into the cavity.

7. The vacuum adiabatic body according to claim 3, wherein the second compartment is provided at a top of a first side of the heat exchange module.

8. A refrigerating or warming apparatus comprising: a cavity having at least one sidewall that is a vacuum adiabatic body; a machine room provided at a first side of the cavity; a refrigerator bottom frame on which the cavity and the machine room are seated; a compressor provided in the machine room and configured to compress a refrigerant; a first heat exchange module provided in the machine room and configured to allow the refrigerant to be heat-exchanged; a second heat exchange module accommodated in the cavity and corresponding to the at least one sidewall of the cavity to allow the refrigerant to be heat-exchanged; and a temperature sensor provided in the second heat exchange module and configured to measure a temperature of the cavity.

9. The refrigerating or warming apparatus according to claim 8, wherein the temperature sensor is provided at an upper portion of the second heat exchange module.

10. The refrigerating or warming apparatus according to claim 8, wherein the second heat exchange module comprises a first compartment provided at a lower side of the second heat exchange module and including an evaporator and a sirocco fan provided above the evaporator.

11. The refrigerating or warming apparatus according to claim 10, further comprising a second compartment provided adjacent to the first compartment and a third compartment in which the temperature sensor is provided, the third compartment being adjacent to the second compartment and spaced apart from the first compartment.

12. The refrigerating or warming apparatus according to claim 10, wherein the sirocco fan is configured to suction air through a rear side thereof and discharge air to a lower side thereof.

13. The refrigerating or warming apparatus according to claim 8, wherein the temperature sensor communicates with the cavity.

14. A refrigerator comprising: a first plate that defines at least a portion of a first wall adjacent to a first space having a first temperature;
    a second plate that defines at least a portion of a second wall adjacent to a second space having a second temperature different from the first temperature;
    a seal that seals the first plate and the second plate to provide a third space between the first plate and the second plate that has a third temperature between the first temperature and the second temperature and the third space is in a vacuum state; a support that supports the third space;
    a thermal insulator that reduces heat transfer between the first plate and the second plate; a vacuum port through which air in the third space is discharged;
    a cover that closes at least a portion of an opening of the cavity that is defined by the first space; a first heat exchange module provided in the first space and configured to evaporate a refrigerant;
    a second heat exchange module provided in the second space and configured to condense the refrigerant; and a conduit which connects the first heat exchange module to the second heat exchange module and through which the refrigerant flows, wherein the first heat exchange module is arranged on an inner surface of the cavity, at least one side surface and a rear surface of the first heat exchange module are thermally insulated by the third space that is in the vacuum state, and
    a top surface of the first heat exchange module is thermally insulated by a separate adiabatic material other than the third space that is in the vacuum state.

15. The refrigerator according to claim 14, further comprising a cover that defines an inner space of the first heat exchange module, wherein the cover comprises:
    a rear cover; and
    a front cover connected to the rear cover and comprising a cold air suction port at a lower portion thereof and a cold air discharge port at a center of the front cover.

16. The refrigerator according to claim 15, wherein the cold air discharge port is provided at a location between one half and two thirds from a bottom of the cavity.

17. The refrigerator according to claim 15, wherein the cold air discharge port is provided at a lateral center of the cavity to discharge cold air.

18. The refrigerator according to claim 15, further comprising: a fan provided in the inner space of the first heat exchange module; and a louver supported by the cover and configured to guide a flow of the cold air discharged from the fan.

19. The refrigerator according to claim 18, further including a container holder attached to the cover and configured to be rotated, wherein an orientation of the louver is adjusted when the container holder is rotated.

20. The refrigerator according to claim 18, wherein the louver comprises a first plurality of blades, wherein each of the first plurality of blades is perpendicular to a front surface of the front cover; and
    a second plurality of blades, wherein each of the second plurality of blades is angled less than 90° with respect to the front surface of the front cover.

* * * * *